US010531468B2

(12) United States Patent
Ruan et al.

(10) Patent No.: US 10,531,468 B2
(45) Date of Patent: Jan. 7, 2020

(54) CHANNEL MANAGEMENT METHOD AND DEVICE FOR WIRELESS LOCAL AREA NETWORK IN RAIL TRANSPORT, AND WIRELESS LOCAL AREA NETWORK SYSTEM IN RAIL TRANSPORT

(71) Applicant: Huawei Technologies Co., Ltd., Shenzhen (CN)

(72) Inventors: Wei Ruan, Shanghai (CN); Hongyi Tan, Suzhou (CN); Mingyue Wang, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 153 days.

(21) Appl. No.: 15/694,446

(22) Filed: Sep. 1, 2017

(65) Prior Publication Data

US 2017/0367088 A1 Dec. 21, 2017

Related U.S. Application Data

(63) Continuation of application No. PCT/CN2016/074768, filed on Feb. 27, 2016.

(30) Foreign Application Priority Data

Mar. 3, 2015 (CN) .......................... 2015 1 0093575

(51) Int. Cl.
*H04W 72/04* (2009.01)
*H04W 24/02* (2009.01)
(Continued)

(52) U.S. Cl.
CPC ......... *H04W 72/048* (2013.01); *H04W 24/02* (2013.01); *H04W 64/00* (2013.01);
(Continued)

(58) Field of Classification Search
CPC ... H04W 72/048; H04W 24/02; H04W 84/12; H04W 88/08; H04L 67/12
See application file for complete search history.

(56) References Cited

U.S. PATENT DOCUMENTS 8,914,167 B2 12/2014 Smith
2005/0259619 A1 11/2005 Boettle et al.
(Continued)

FOREIGN PATENT DOCUMENTS

CN 1778124 A 5/2006
CN 101917749 A 12/2010
(Continued)

OTHER PUBLICATIONS

Machine Translation and Abstract of Chinese Publication No. CN1778124, May 24, 2006, 47 pages.
(Continued)

*Primary Examiner* — Kent Krueger
(74) *Attorney, Agent, or Firm* — Conley Rose, P.C.

(57) ABSTRACT

A channel management method and device for a wireless local area network (WLAN) in rail transport, where the method includes instructing, by the controller, a to-be-changed trackside access point (AP) to change an operating channel from an operating channel of a first vehicle-mounted AP on a first vehicle to an operating channel of a second vehicle-mounted AP on a second vehicle, where the to-be-changed trackside AP for the first vehicle is behind the first vehicle, and a distance of the to-be-changed trackside AP to the first vehicle exceeds a preset threshold. Because operating channels of two vehicle-mounted APs are different, interference between vehicle-mounted APs on one vehicle and a next vehicle is low. Moreover, a trackside AP behind a previous vehicle is instructed to change a channel
(Continued)

such that a vehicle-mounted AP does not need to change a channel. Therefore, a handover time is short.

20 Claims, 3 Drawing Sheets

(51) Int. Cl.

| | |
|---|---|
| ***H04W 64/00*** | (2009.01) |
| *H04L 29/08* | (2006.01) |
| *H04W 84/12* | (2009.01) |
| *H04W 88/08* | (2009.01) |

(52) U.S. Cl.

CPC ............. *H04L 67/12* (2013.01); *H04W 84/12* (2013.01); *H04W 88/08* (2013.01)

(56) References Cited

U.S. PATENT DOCUMENTS

| | | | | |
|---|---|---|---|---|
| 2012/0095626 | A1 | 4/2012 | Smith | |
| 2012/0163317 | A1 | 6/2012 | Yu et al. | |
| 2014/0146749 | A1* | 5/2014 | Barker ................ | H04W 40/026 370/328 |
| 2014/0328294 | A1 | 11/2014 | Malkov et al. | |

FOREIGN PATENT DOCUMENTS

| | | | |
|---|---|---|---|
| CN | 102256336 | A | 11/2011 |
| CN | 102883382 | A | 1/2013 |

OTHER PUBLICATIONS

Machine Translation and Abstract of Chinese Publication No. CN102256336, Nov. 23, 2011, 10 pages.

Foreign Communication From a Counterpart Application, Chinese Application No. 2015100935757, Chinese Search Report dated Sep. 19, 2018, 2 pages.

Foreign Communication From a Counterpart Application, Chinese Application No. 2015100935757, Chinese Office Action dated Sep. 30, 2018, 4 pages.

Machine Translation and Abstract of Chinese Publication No. CN101917749, Dec. 15, 2010, 20 pages.

Machine Translation and Abstract of Chinese Publication No. CN102883382, Jan. 16, 2013, 15 pages.

Foreign Communication From a Counterpart Application, PCT Application No. PCT/CN2016/074768, English Translation of International Search Report dated Jun. 3, 2016, 2 pages.

Foreign Communication From a Counterpart Application, PCT Application No. PCT/CN2016/074768, English Translation of Written Opinion dated Jun. 3, 2016, 6 pages.

Lannoo, B., et al.,"Radio-over-Fiber-Based Solution to Provide Broadband Internet Access to Train Passengers", XP011168276, IEEE Communications Magazine, vol. 44, No. 2, Feb. 1, 2007, pp. 56-62.

Foreign Communication From a Counterpart Application, European Application No. 16758453.1, Extended European Search Report dated Jan. 19, 2018, 12 pages.

* cited by examiner

```
┌─────────────────────────────────────────────────────────────┐
│ The controller determines a to-be-changed trackside AP for a first │ 102
│ vehicle, among the multiple trackside APs, where the to-be-changed │
│ trackside AP for the first vehicle is a trackside AP that is behind the first │
│ vehicle according to a running direction of the first vehicle and whose │
│ distance to the first vehicle exceeds a preset threshold, a current operating │
│ channel of the to-be-changed trackside AP for the first vehicle is a first │
│ channel, and the first channel is an operating channel of a first vehicle- │
│ mounted AP carried by the first vehicle │
└─────────────────────────────────────────────────────────────┘
                              │
                              ▼
┌─────────────────────────────────────────────────────────────┐ 104
│ The controller instructs the to-be-changed trackside AP for the first │
│ vehicle to change the operating channel to a second channel, where the │
│ second channel is an operating channel that is specified by the controller │
│ for a second vehicle-mounted AP carried by a second vehicle, the second │
│ vehicle is a vehicle following the first vehicle, the second channel is │
│ different from the first channel, and the first vehicle and the second │
│ vehicle belong to one independent track │
└─────────────────────────────────────────────────────────────┘
```

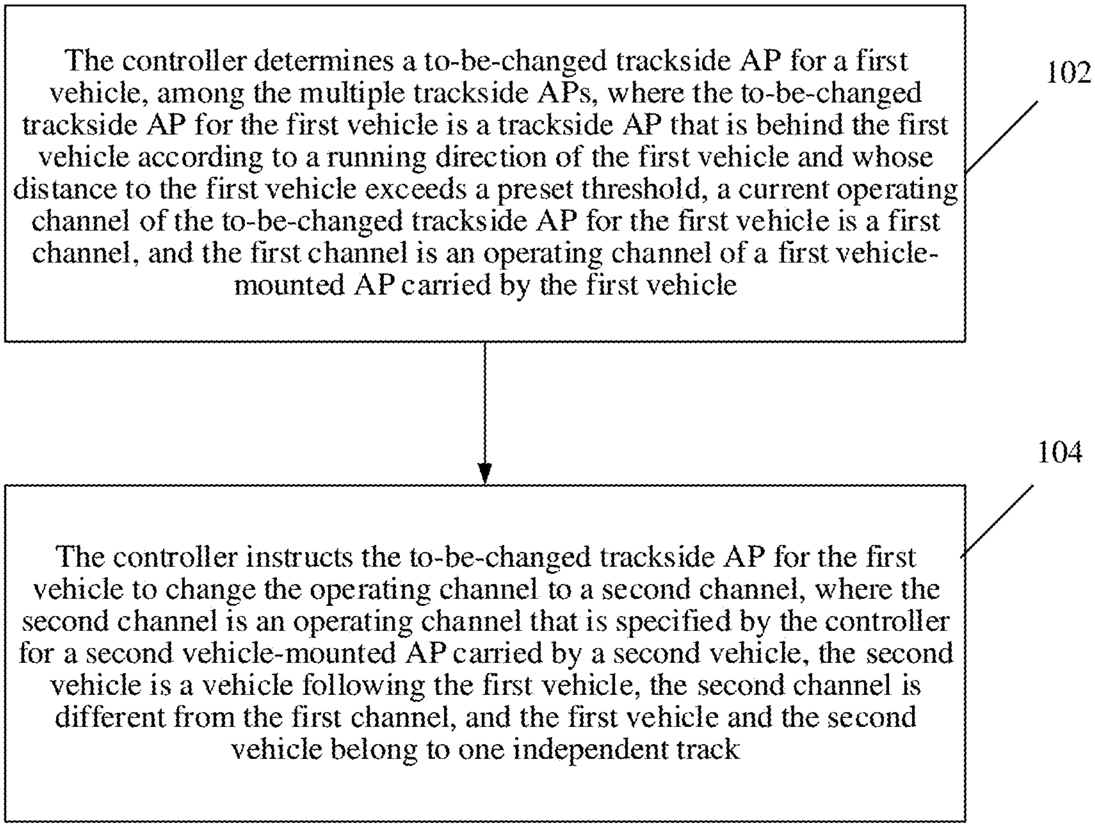

FIG. 1

FIG. 2

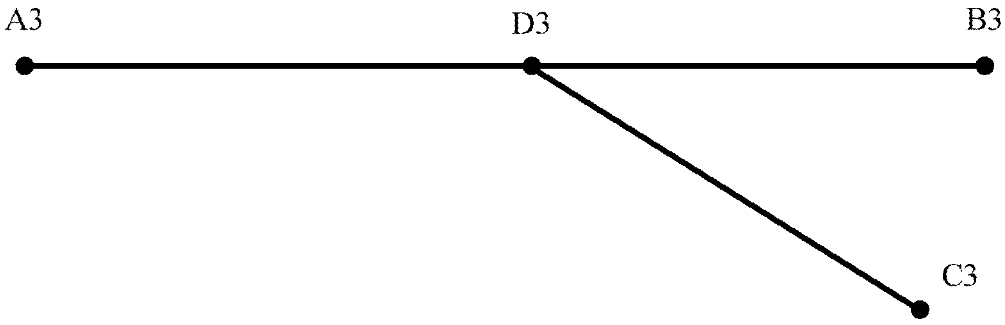

FIG. 3

CHANNEL MANAGEMENT METHOD AND DEVICE FOR WIRELESS LOCAL AREA NETWORK IN RAIL TRANSPORT, AND WIRELESS LOCAL AREA NETWORK SYSTEM IN RAIL TRANSPORT

CROSS-REFERENCE TO RELATED APPLICATIONS

This application is a continuation of International Patent Application No. PCT/CN2016/074768 filed on Feb. 27, 2016, which claims priority to Chinese Patent Application No. 201510093575.7 filed on Mar. 3, 2015. The disclosures of the aforementioned applications are hereby incorporated by reference in their entireties.

TECHNICAL FIELD

This application relates to the communications field, and in particular, to a channel management method and device for a wireless local area network (WLAN) in rail transport, and a WLAN system in rail transport.

BACKGROUND

To meet an Internet access requirement of passengers in a vehicle in rail transport, a vehicle-ground communications system may be deployed for the vehicle. The vehicle-ground communications system may be deployed using a WLAN technology. A radio link is set up between a vehicle-mounted access point (AP) on the vehicle and a trackside AP deployed along a track. A device of a passenger in the vehicle accesses a network using the vehicle-mounted AP and the trackside AP. During running of the vehicle, the vehicle-mounted AP is handed over between multiple trackside APs. Because the vehicle runs at a high speed, to shorten a time for handing over the vehicle-mounted AP between the trackside APs, one channel is configured for all the trackside APs, and the channel is also configured for vehicle-mounted APs on all vehicles. Because vehicle-mounted APs on one vehicle and a next vehicle use the same channel, interference between the vehicle-mounted APs on the two vehicles is serious.

SUMMARY

A channel management method and device for a WLAN in rail transport, and a WLAN system in rail transport are provided in order to reduce interference between vehicle-mounted APs while maintaining a short time for handing over a vehicle-mounted AP between trackside APs.

According to a first aspect, a channel management method for a WLAN in rail transport is provided, where at least two vehicles run on a track, the track includes at least one independent track, each of the at least two vehicles carries a respective vehicle-mounted AP, multiple trackside APs are installed along the track, and the method includes determining, by a controller, a to-be-changed trackside AP for a first vehicle, among the multiple trackside APs, where the to-be-changed trackside AP for the first vehicle is a trackside AP that is behind the first vehicle according to a running direction of the first vehicle and whose distance to the first vehicle exceeds a preset threshold, a current operating channel of the to-be-changed trackside AP for the first vehicle is a first channel, and the first channel is an operating channel of a first vehicle-mounted AP carried by the first vehicle, and instructing, by the controller, the to-be-changed trackside AP for the first vehicle to change the operating channel to a second channel, where the second channel is an operating channel of a second vehicle-mounted AP carried by a second vehicle, the second vehicle is a vehicle following the first vehicle, the second channel is different from the first channel, and the first vehicle and the second vehicle belong to one independent track.

In the method, because respective vehicle-mounted APs on at least two vehicles that run on a track use different operating channels, interference between vehicle-mounted APs on one vehicle and a next vehicle is low. Moreover, a trackside AP behind the vehicle is instructed to change from a channel of a vehicle-mounted AP on the vehicle to a channel of a vehicle-mounted AP on the next vehicle such that a vehicle-mounted AP can be handed over to a surrounding trackside AP with no need to change a channel of the vehicle-mounted AP. Therefore, a handover time is short.

With reference to the first aspect, in first implementation of the first aspect, the preset threshold is a distance threshold, and determining, by a controller, a to-be-changed trackside AP for a first vehicle, among the multiple trackside APs includes obtaining, by the controller, a physical position of the first vehicle, and determining, as the to-be-changed trackside AP, a trackside AP of the multiple trackside APs that is behind the first vehicle, whose current operating channel is the first channel, and from whose physical position a distance to the physical position of the first vehicle is greater than the distance threshold.

With reference to the first implementation of the first aspect, in second implementation of the first aspect, obtaining, by the controller, a physical position of the first vehicle includes estimating the physical position of the first vehicle according to a physical position of a trackside AP of the multiple trackside APs that is communicating with the first vehicle-mounted AP.

With reference to the first implementation of the first aspect, in third implementation of the first aspect, obtaining, by the controller, a physical position of the first vehicle includes estimating the physical position of the first vehicle according to a physical position of a trackside AP of the multiple trackside APs that is communicating with the first vehicle-mounted AP, a radio link setup time, and a speed of the first vehicle, where the radio link setup time is a time that a radio link is set up between the first vehicle-mounted AP and the trackside AP that is communicating with the first vehicle-mounted AP.

Introducing the radio link setup time and the vehicle speed enables more accurate estimation of the physical position of the first vehicle.

With reference to any one of the first aspect, or the first implementation of the first aspect to the third implementation of the first aspect, in fourth implementation of the first aspect, the second vehicle is a next vehicle that is to depart, the second channel is a channel specified by the controller, and the second channel is different from an operating channel of a vehicle-mounted AP on a vehicle that precedes the second vehicle and that is in a track branch to which the second vehicle belongs.

With reference to the fourth implementation of the first aspect, in fifth implementation of the first aspect, the track includes multiple track branches, the second vehicle and the first vehicle belong to different track branches of the multiple track branches respectively, each of the multiple track branches has a respective branch channel set, an intersection set of branch channel sets for any two track branches of the multiple track branches is an empty set, and the second channel is a channel in a branch channel set for the track branch to which the second vehicle belongs.

With reference to any one of the first aspect, or the first implementation of the first aspect to the fifth implementation of the first aspect, in sixth implementation of the first aspect, the at least one independent track includes a first independent track and a second independent track, a set of available channels for multiple trackside APs that are installed along the first independent track is a first track channel set, a set of available channels for multiple trackside APs that are installed along the second independent track is a second track channel set, an intersection set of the first track channel set and the second track channel set is an empty set, directions of the first independent track and the second independent track are opposite, the WLAN is a wireless mesh network, a mesh basic service set (MBSS) of the first independent track is a first MBSS, an MBSS for the second independent track is a second MBSS, and the method further includes instructing, by the controller, a vehicle-mounted AP on a third vehicle that runs to an endpoint along the first independent track, to be handed off from the first MBSS to the second MBSS.

With reference to the sixth implementation of the first aspect, in seventh implementation of the first aspect, the third vehicle carries a third vehicle-mounted AP and a fourth vehicle-mounted AP, an MBSS for the third vehicle-mounted AP is the first MBSS, an MBSS for the fourth vehicle-mounted AP is the second MBSS, the third vehicle-mounted AP is running, the fourth vehicle-mounted AP has stopped running, and instructing, by the controller, a vehicle-mounted AP on a third vehicle that runs to an endpoint along the first independent track, to be handed off from the first MBSS to the second MBSS includes instructing, by the controller, the fourth vehicle-mounted AP to run and instructing the third vehicle-mounted AP to stop running.

According to a second aspect, a channel management device for a WLAN in rail transport is provided, where the channel management device includes a determining unit and an instruction unit, where the determining unit is configured to determine a to-be-changed trackside AP for a first vehicle, among multiple trackside APs, where the to-be-changed trackside AP for the first vehicle is a trackside AP that is behind the first vehicle according to a running direction of the first vehicle and whose distance to the first vehicle exceeds a preset threshold, a current operating channel of the to-be-changed trackside AP for the first vehicle is a first channel, the first channel is an operating channel of a first vehicle-mounted AP carried by the first vehicle, the multiple trackside APs are installed along a track, at least two vehicles run on the track, the track includes at least one independent track, and each of the at least two vehicles carries a respective vehicle-mounted AP, and the instruction unit is configured to instruct the to-be-changed trackside AP for the first vehicle to change the operating channel to a second channel, where the second channel is an operating channel of a second vehicle-mounted AP carried by a second vehicle, the second vehicle is a vehicle following the first vehicle, the second channel is different from the first channel, and the first vehicle and the second vehicle belong to one independent track.

With reference to the second aspect, in first implementation of the second aspect, the preset threshold is a distance threshold, and determining a to-be-changed trackside AP for a first vehicle, among the multiple trackside APs includes obtaining a physical position of the first vehicle, and determining, as the to-be-changed trackside AP, a trackside AP of the multiple trackside APs that is behind the first vehicle, whose current operating channel is the first channel, and from whose physical position a distance to the physical position of the first vehicle is greater than the distance threshold.

With reference to the first implementation of the second aspect, in second implementation of the second aspect, obtaining a physical position of the first vehicle includes estimating the physical position of the first vehicle according to a physical position of a trackside AP of the multiple trackside APs that is communicating with the first vehicle-mounted AP.

With reference to the first implementation of the second aspect, in third implementation of the second aspect, obtaining a physical position of the first vehicle includes estimating the physical position of the first vehicle according to a physical position of a trackside AP of the multiple trackside APs that is communicating with the first vehicle-mounted AP, a radio link setup time, and a speed of the first vehicle, where the radio link setup time is a time that a radio link is set up between the first vehicle-mounted AP and the trackside AP that is communicating with the first vehicle-mounted AP.

With reference to any one of the second aspect, or the first implementation of the second aspect to the third implementation of the second aspect, in fourth implementation of the second aspect, the second vehicle is a next vehicle that is to depart, the second channel is a channel specified by the instruction unit, and the second channel is different from an operating channel of a vehicle-mounted AP on a vehicle that precedes the second vehicle and that is in a track branch to which the second vehicle belongs.

With reference to the fourth implementation of the second aspect, in fifth implementation of the second aspect, the track includes multiple track branches, the second vehicle and the first vehicle belong to different track branches of the multiple track branches respectively, each of the multiple track branches has a respective branch channel set, an intersection set of branch channel sets for any two track branches of the multiple track branches is an empty set, and the second channel is a channel in a branch channel set for the track branch to which the second vehicle belongs.

With reference to any one of the second aspect, or the first implementation of the second aspect to the fifth implementation of the second aspect, in sixth implementation of the second aspect, the at least one independent track includes a first independent track and a second independent track, a set of available channels for multiple trackside APs that are installed along the first independent track is a first track channel set, a set of available channels for multiple trackside APs that are installed along the second independent track is a second track channel set, an intersection set of the first track channel set and the second track channel set is an empty set, directions of the first independent track and the second independent track are opposite, the WLAN is a wireless mesh network, an MBSS for the first independent track is a first MBSS, an MBSS for the second independent track is a second MBSS, and the instruction unit is further configured to instruct a vehicle-mounted AP on a third vehicle that runs to an endpoint along the first independent track, to be handed off from the first MBSS to the second MBSS.

With reference to the sixth implementation of the second aspect, in seventh implementation of the second aspect, the third vehicle carries a third vehicle-mounted AP and a fourth vehicle-mounted AP, an MBSS for the third vehicle-mounted AP is the first MBSS, an MBSS for the fourth vehicle-mounted AP is the second MBSS, the third vehicle-mounted AP is running, the fourth vehicle-mounted AP has stopped running, and instructing a vehicle-mounted AP on a third vehicle that runs to an endpoint along the first independent track, to be handed off from the first MBSS to the second MBSS includes instructing the fourth vehicle-mounted AP to run and instructing the third vehicle-mounted AP to stop running.

According to a third aspect, a WLAN system in rail transport is provided, where the WLAN system includes a controller and multiple trackside APs, the controller is connected to each of the multiple trackside APs, the multiple trackside APs are installed along a track, at least two vehicles run on the track, the track includes at least one independent track, and each of the at least two vehicles carries a respective vehicle-mounted AP, where each of the multiple trackside APs is configured to provide a radio link connected to a vehicle-mounted AP, the controller is configured to determine a to-be-changed trackside AP for a first vehicle, among the multiple trackside APs, where the to-be-changed trackside AP for the first vehicle is a trackside AP that is behind the first vehicle according to a running direction of the first vehicle and whose distance to the first vehicle exceeds a preset threshold, a current operating channel of the to-be-changed trackside AP for the first vehicle is a first channel, and the first channel is an operating channel of a first vehicle-mounted AP carried by the first vehicle, and the controller is further configured to instruct the to-be-changed trackside AP for the first vehicle to change the operating channel to a second channel, where the second channel is an operating channel of a second vehicle-mounted AP carried by a second vehicle, the second vehicle is a vehicle following the first vehicle, the second channel is different from the first channel, and the first vehicle and the second vehicle belong to one independent track.

With reference to the third aspect, in first implementation of the third aspect, the preset threshold is a distance threshold, and determining, by the controller, a to-be-changed trackside AP for a first vehicle, among the multiple trackside APs includes obtaining, by the controller, a physical position of the first vehicle, and determining, as the to-be-changed trackside AP, a trackside AP of the multiple trackside APs that is behind the first vehicle, whose current operating channel is the first channel, and from whose physical position a distance to the physical position of the first vehicle is greater than the distance threshold.

With reference to the first implementation of the third aspect, in second implementation of the third aspect, obtaining, by the controller, a physical position of the first vehicle includes estimating the physical position of the first vehicle according to a physical position of a trackside AP of the multiple trackside APs that is communicating with the first vehicle-mounted AP.

With reference to the first implementation of the third aspect, in third implementation of the third aspect, obtaining, by the controller, a physical position of the first vehicle includes estimating the physical position of the first vehicle according to a physical position of a trackside AP of the multiple trackside APs that is communicating with the first vehicle-mounted AP, a radio link setup time, and a speed of the first vehicle, where the radio link setup time is a time that a radio link is set up between the first vehicle-mounted AP and the trackside AP that is communicating with the first vehicle-mounted AP.

With reference to any one of the third aspect, or the first implementation of the third aspect to the third implementation of the third aspect, in fourth implementation of the third aspect, the second vehicle is a next vehicle that is to depart, the second channel is a channel specified by the controller, and the second channel is different from an operating channel of a vehicle-mounted AP on a vehicle that precedes the second vehicle and that is in a track branch to which the second vehicle belongs.

With reference to the fourth implementation of the third aspect, in fifth implementation of the third aspect, the track includes multiple track branches, the second vehicle and the first vehicle belong to different track branches of the multiple track branches respectively, each of the multiple track branches has a respective branch channel set, an intersection set of branch channel sets for any two track branches of the multiple track branches is an empty set, and the second channel is a channel in a branch channel set for the track branch to which the second vehicle belongs.

With reference to any one of the third aspect, or the first implementation of the third aspect to the fifth implementation of the third aspect, in sixth implementation of the third aspect, the at least one independent track includes a first independent track and a second independent track, a set of available channels for multiple trackside APs that are installed along the first independent track is a first track channel set, a set of available channels for multiple trackside APs that are installed along the second independent track is a second track channel set, an intersection set of the first track channel set and the second track channel set is an empty set, directions of the first independent track and the second independent track are opposite, the WLAN is a wireless mesh network, an MBSS for the first independent track is a first MBSS, an MBSS for the second independent track is a second MBSS, and the controller is further configured to instruct a vehicle-mounted AP on a third vehicle that runs to an endpoint along the first independent track, to be handed off from the first MBSS to the second MBSS.

With reference to the sixth implementation of the third aspect, in seventh implementation of the third aspect, the third vehicle carries a third vehicle-mounted AP and a fourth vehicle-mounted AP, an MBSS for the third vehicle-mounted AP is the first MBSS, an MBSS for the fourth vehicle-mounted AP is the second MBSS, the third vehicle-mounted AP is running, the fourth vehicle-mounted AP has stopped running, and instructing, by the controller, a vehicle-mounted AP on a third vehicle that runs to an endpoint along the first independent track, to be handed off from the first MBSS to the second MBSS includes instructing, by the controller, the fourth vehicle-mounted AP to run and instructing the third vehicle-mounted AP to stop running.

With reference to any one of the third aspect, or the first implementation of the third aspect to the seventh implementation of the third aspect, in eighth implementation of the third aspect, the WLAN system further includes the first vehicle-mounted AP and the second vehicle-mounted AP.

According to a fourth aspect, a controller is provided, including a processor and a communications interface, where the communications interface is configured to connect to multiple trackside APs, where the multiple trackside APs are installed along a track, at least two vehicles run on the track, each of the at least two vehicles carries a respective vehicle-mounted AP, and the track includes at least one independent track, the processor is configured to determine a to-be-changed trackside AP for a first vehicle, among the multiple trackside APs, where the to-be-changed trackside AP for the first vehicle is a trackside AP that is behind the first vehicle according to a running direction of the first vehicle and whose distance to the first vehicle exceeds a preset threshold, a current operating channel of the to-be-changed trackside AP for the first vehicle is a first channel, and the first channel is an operating channel of a first vehicle-mounted AP carried by the first vehicle, and the processor is further configured to instruct, using the communications interface, the to-be-changed trackside AP for the first vehicle to change the operating channel to a second channel, where the second channel is an operating channel of a second vehicle-mounted AP carried by a second vehicle, the second vehicle is a vehicle following the first vehicle, the second channel is different from the first channel, and the first vehicle and the second vehicle belong to one independent track.

With reference to the fourth aspect, in first implementation of the fourth aspect, the preset threshold is a distance threshold, and determining, by the processor, a to-be-changed trackside AP for a first vehicle, among the multiple trackside APs includes obtaining, by the processor, a physical position of the first vehicle, and determining, as the to-be-changed trackside AP, a trackside AP of the multiple trackside APs that is behind the first vehicle, whose current operating channel is the first channel, and from whose physical position a distance to the physical position of the first vehicle is greater than the distance threshold.

With reference to the first implementation of the fourth aspect, in second implementation of the fourth aspect, obtaining, by the processor, a physical position of the first vehicle includes estimating the physical position of the first vehicle according to a physical position of a trackside AP of the multiple trackside APs that is communicating with the first vehicle-mounted AP.

With reference to the first implementation of the fourth aspect, in third implementation of the fourth aspect, obtaining, by the processor, a physical position of the first vehicle includes estimating the physical position of the first vehicle according to a physical position of a trackside AP of the multiple trackside APs that is communicating with the first vehicle-mounted AP, a radio link setup time, and a speed of the first vehicle, where the radio link setup time is a time that a radio link is set up between the first vehicle-mounted AP and the trackside AP that is communicating with the first vehicle-mounted AP.

With reference to any one of the fourth aspect, or the first implementation of the fourth aspect to the third implementation of the fourth aspect, in fourth implementation of the fourth aspect, the second vehicle is a next vehicle that is to depart, the second channel is a channel specified by the controller, and the second channel is different from an operating channel of a vehicle-mounted AP on a vehicle that precedes the second vehicle and that is in a track branch to which the second vehicle belongs.

With reference to the fourth implementation of the fourth aspect, in fifth implementation of the fourth aspect, the track includes multiple track branches, the second vehicle and the first vehicle belong to different track branches of the multiple track branches respectively, each of the multiple track branches has a respective branch channel set, an intersection set of branch channel sets for any two track branches of the multiple track branches is an empty set, and the second channel is a channel in a branch channel set for the track branch to which the second vehicle belongs.

With reference to any one of the fourth aspect, or the first implementation of the fourth aspect to the fifth implementation of the fourth aspect, in sixth implementation of the fourth aspect, the at least one independent track includes a first independent track and a second independent track, a set of available channels for multiple trackside APs that are installed along the first independent track is a first track channel set, a set of available channels for multiple trackside APs that are installed along the second independent track is a second track channel set, an intersection set of the first track channel set and the second track channel set is an empty set, directions of the first independent track and the second independent track are opposite, the WLAN is a wireless mesh network, an MBSS for the first independent track is a first MBSS, an MBSS for the second independent track is a second MBSS, and the processor is further configured to instruct, using the communications interface, a vehicle-mounted AP on a third vehicle that runs to an endpoint along the first independent track, to be handed off from the first MBSS to the second MBSS.

With reference to the sixth implementation of the fourth aspect, in seventh implementation of the fourth aspect, the third vehicle carries a third vehicle-mounted AP and a fourth vehicle-mounted AP, an MBSS for the third vehicle-mounted AP is the first MBSS, an MBSS for the fourth vehicle-mounted AP is the second MBSS, the third vehicle-mounted AP is running, the fourth vehicle-mounted AP has stopped running, and instructing, by the processor using the communications interface, a vehicle-mounted AP on a third vehicle that runs to an endpoint along the first independent track, to be handed off from the first MBSS to the second MBSS includes instructing, by the processor using the communications interface, the fourth vehicle-mounted AP to run, and instructing, using the communications interface, the third vehicle-mounted AP to stop running.

In this application, because respective vehicle-mounted APs on at least two vehicles that run on a track use different operating channels, interference between vehicle-mounted APs on one vehicle and a next vehicle is low. Moreover, a trackside AP behind the vehicle is instructed to change from a channel of a vehicle-mounted AP on the vehicle to a channel of a vehicle-mounted AP on the next vehicle such that a vehicle-mounted AP can be handed over to a surrounding trackside AP with no need to change a channel of the vehicle-mounted AP. Therefore, a handover time is short.

BRIEF DESCRIPTION OF DRAWINGS

FIG. 1 is a flowchart of a channel management method for a WLAN in rail transport according to an embodiment of the present disclosure;

FIG. 2 is a schematic diagram of a track with a linear topology according to an embodiment of the present disclosure;

FIG. 3 is a schematic diagram of a track with a Y-shaped topology according to an embodiment of the present disclosure;

DESCRIPTION OF EMBODIMENTS

The following describes the embodiments of the present disclosure with reference to FIG. 1 to FIG. 7.

FIG. 1 is a flowchart of a channel management method for a WLAN in rail transport according to an embodiment of the present disclosure. Rail transport is a means of conveyance by running along tracks, and includes a means of conveyance of passengers and goods on wheeled vehicles running on tracks (for example, train transport, light rail, tram, and subway) and a means of conveyance by running along tracks without using wheels (for example, maglev, funicular, and aerial tramway). In rail transport, vehicles are directionally guided by the tracks on which they run. In a rail transport system in this embodiment of the present disclosure, at least two vehicles run on a track. Each of the at least two vehicles carries a respective vehicle-mounted AP. Multiple trackside APs are installed along the track. The track may be in any shape, for example, a line shown in FIG. 2, a Y shape shown in FIG. 3, or a ring shown in FIG. 4. In this embodiment of the present disclosure, a track on which all running vehicles have one startpoint, one endpoint, and one running route is treated as one track branch.

Figure 4:
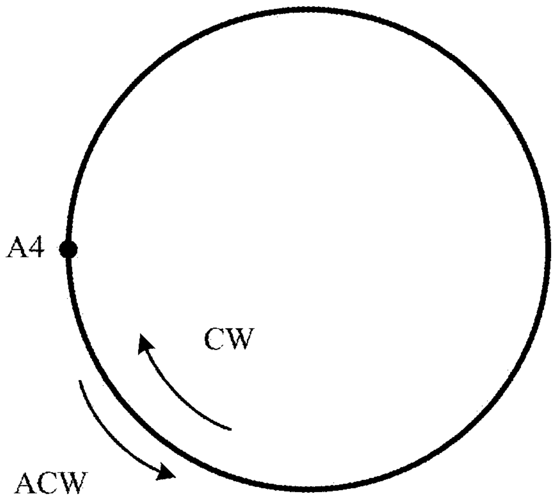
FIG. 4 is a schematic diagram of a track with a ring topology according to an embodiment of the present disclosure.

For example, if all vehicles in FIG. 2 depart from a point A2 and finish running at a point B2, there is only one track branch in FIG. 2. The track branch is an entire track, denoted by (A2, B2). In FIG. 2, if some vehicles depart from a point A2 and finish running at a point B2, and other vehicles depart from the point A2 and finish running at a point C2, there are two track branches (A2, C2, B2) and (A2, C2) in FIG. 2. The two track branches overlap at a segment (A2, C2). In FIG. 3, if some vehicles depart from a point A3 and finish running at a point B3, and other vehicles depart from the point A3 and finish running at a point C3, there are two track branches (A3, D3, B3) and (A3, D3, C3) in FIG. 3. The two track branches overlap at a segment (A3, D3). In FIG. 4, if all vehicles depart from a point A4, run in a clockwise direction, and finish running at the point A4, there is only one track branch (A4, CW) in FIG. 4. CW represents clockwise.

The track includes at least one independent track. The track may include one or more independent tracks in only one direction, and in addition, may further include one or more independent tracks whose direction is opposite to that of the one or more independent tracks in the one direction. The foregoing independent track refers to a track whose trackside APs have independent available channel space. If the track includes only one independent track, available channel space for trackside APs of the independent track is naturally independent. If the track includes two or more independent tracks, that available channel space for trackside APs of the independent tracks is independent means that the available channel space for the trackside APs of the independent tracks does not overlap each other. For example, the track includes two independent tracks. Then, two sets of trackside APs are installed along the two independent tracks respectively, either set of trackside APs has respective available channel space, and the two blocks of available channel space are independent of each other. Therefore, an intersection set of track channel sets of any two independent tracks of the two or more independent tracks is an empty set. The foregoing direction refers to a running direction of a vehicle running on the track. A first independent track and a second independent track may both include one or more track branches. Respective track branches of the first independent track and the second independent track are not required to be symmetric.

Directions of two independent tracks, for example, the first independent track and the second independent track, of the track may be opposite. For example, the track in FIG. 2 may include a first independent track (A2, B2) and a second independent track (B2, A2), and directions of the first independent track and the second independent track are opposite. The first independent track may further include one or more track branches, for example, (A2, C2, B2) and (A2, C2). The second independent track may also include one or more track branches, for example, (B2, C2, A2) and (C2, A2). A track in FIG. 3 may include a first independent track (A3, D3, (B3, C3)) and a second independent track ((B3, C3), D3, A3). The first independent track may further include one or more track branches, for example, (A3, D3, B3) and (A3, D3, C3). The second independent track may also include one or more track branches, for example, (B3, D3, A3) and (C3, D3). The respective track branches of the first independent track and the second independent track in the foregoing example are not absolutely symmetric. A track in FIG. 4 includes a first independent track (A4, CW) and a second independent track (A4, ACW). ACW represents anticlockwise. A set of available channels for multiple trackside APs that are installed along the first independent track is a first track channel set. A set of available channels for multiple trackside APs that are installed along the second independent track is a second track channel set. An intersection set of the first track channel set and the second track channel set is an empty set.

Directions of two independent tracks, for example, a third independent track and a fourth independent track, of the track may also be the same. For example, two physical tracks that are laid in parallel and that operate in one direction may be considered as two independent tracks in one direction. Herein, if a vehicle carries vehicle-mounted APs that use different operating channels, the vehicle-mounted APs that use different operating channels may be considered as vehicle-mounted APs carried by vehicles on different independent tracks. For details, refer to subsequent examples.

To reduce interference between at least two vehicles running on a track, in this embodiment of the present disclosure, best effort is made such that respective vehicle-mounted APs on the at least two vehicles running on the track use different operating channels. Because a total quantity of available channels in a WLAN is limited, generally, ensuring that vehicle-mounted APs on two adjacent vehicles use different operating channels can serve the purpose. For example, if a track includes only one independent track, it is ensured that vehicle-mounted APs on two adjacent vehicles on the independent track use different operating channels. If a track includes two or more independent tracks, it is ensured that vehicle-mounted APs on two adjacent vehicles on any independent track use different operating channels. If one of the independent tracks includes two or more track branches, it is ensured that vehicle-mounted APs on two adjacent vehicles on any track branch use different operating channels. To ensure that vehicle-mounted APs on two adjacent vehicles use different operating channels, a controller executes a method that includes the following steps. The method includes the following steps.

Step 102: The controller determines a to-be-changed trackside AP for a first vehicle, among the multiple trackside APs, where the to-be-changed trackside AP for the first vehicle is a trackside AP that is behind the first vehicle according to a running direction of the first vehicle and whose distance to the first vehicle exceeds a preset threshold, a current operating channel of the to-be-changed trackside AP for the first vehicle is a first channel, and the first channel is an operating channel of a first vehicle-mounted AP carried by the first vehicle.

Step 104: The controller instructs the to-be-changed trackside AP for the first vehicle to change the operating channel to a second channel, where the second channel is an operating channel that is specified by the controller for a second vehicle-mounted AP carried by a second vehicle, the second vehicle is a vehicle following the first vehicle, the second channel is different from the first channel, and the first vehicle and the second vehicle belong to one independent track.

The controller may be a server, may be a network device such as a router or a network switch, or may be a control center including multiple devices. The controller is connected to each of the multiple trackside APs. The controller may be connected to the trackside APs using a wired network, a wireless network, or a hybrid wired/wireless network. The wired network or wireless network may include another network device. The controller may be directly connected to each trackside AP, or may be connected to one of the multiple trackside APs via another trackside AP of the multiple trackside APs. The controller may be further connected to vehicle-mounted APs via the trackside APs. The controller may control APs (including the trackside APs and the vehicle-mounted APs) using a proprietary protocol or a standard protocol. The standard protocol may be, for example, the Control and Provisioning of Wireless Access Points (CAPWAP) protocol. If the controller controls APs using the CAPWAP protocol, the controller serves as an Access Controller (AC) in the CAPWAP protocol, and the APs serve as Wireless Termination Points (WTP) in the CAPWAP protocol.

Each vehicle may carry one or more vehicle-mounted APs. If multiple vehicle-mounted APs are carried by one vehicle, the multiple vehicle-mounted APs may use one operating channel, or may use different operating channels. If the multiple vehicle-mounted APs use one operating channel, the vehicle-mounted APs may be considered as one vehicle-mounted AP. If the multiple vehicle-mounted APs use different operating channels, the vehicle-mounted APs carried by one vehicle that use different operating channels may be considered as vehicle-mounted APs carried by different vehicles. Vehicle-mounted APs carried by one vehicle that use different operating channels may be considered as vehicle-mounted APs carried by different vehicles on one independent track, or may be considered as vehicle-mounted APs carried by vehicles on different independent tracks. For example, if vehicle-mounted APs carried by one vehicle that use different operating channels are considered as vehicle-mounted APs carried by vehicles on different independent tracks, two sets of trackside APs are installed beside a track. Either set of trackside APs has respective available channel space, and the two blocks of available channel space are independent of each other. That is, the track is considered to include a third independent track and a fourth independent track. Directions of the third independent track and the fourth independent track are the same. A set of available channels for multiple trackside APs that are installed along the third independent track is a third track channel set. A set of available channels for multiple trackside APs that are installed along the fourth independent track is a fourth track channel set. An intersection set of the third track channel set and the fourth track channel set is an empty set. Correspondingly, the vehicle carries two vehicle-mounted APs that belong to the third independent track and the fourth independent track respectively, and operating channels of vehicle-mounted APs that belong to different independent tracks are specified in corresponding track channel sets. With the foregoing deployment, total bandwidth of vehicle-mounted APs on vehicles can be increased.

To shorten a time for handing over a vehicle-mounted AP between trackside APs, an operating channel of the vehicle-mounted AP needs to be kept unchanged in an entire running course of a vehicle, and a trackside AP needs to use an operating channel the same as that of the vehicle-mounted AP on the vehicle when the vehicle approaches the trackside AP. In this case, the controller instructs, according to a position of the vehicle, a trackside AP that is behind the vehicle and far from the vehicle to switch to an operating channel used by a next vehicle. That the trackside AP is behind the vehicle is determined using a vehicle running direction of the first vehicle as a criterion. The trackside AP that needs to be instructed by the controller to switch to the operating channel used by the next vehicle is a to-be-changed trackside AP. An example is used in which a channel of a trackside AP between the first vehicle and the second vehicle is changed. The to-be-changed trackside AP is a to-be-changed trackside AP for the first vehicle, and the to-be-changed trackside AP for the first vehicle is a trackside AP that is behind the first vehicle and whose distance to the first vehicle exceeds a preset threshold. The preset threshold may be a distance threshold, or may be a quantity threshold. The preset threshold may be related to a distance between two vehicles on the track, for example, about one half or one third of the distance between two vehicles on the track, or may be a quantity of trackside APs that represents the foregoing distance.

If the preset threshold is a distance threshold, determining, by the controller, a to-be-changed trackside AP for a first vehicle, among the multiple trackside APs includes obtaining, by the controller, a physical position of the first vehicle, and determining, as the to-be-changed trackside AP, a trackside AP of the multiple trackside APs that is behind the first vehicle, whose current operating channel is the first channel and from whose physical position a distance to the physical position of the first vehicle is greater than the distance threshold. The distance threshold may be a fixed value, or may be a variable value.

A speed at which the vehicle runs on the track is variable. For example, when the vehicle stops by a platform, the speed of the vehicle is zero. A channel change takes time, and a vehicle that is running at a high speed requires that a front trackside AP farther from the vehicle change a channel in advance. Therefore, it may be considered that the distance threshold is set to be a function of a speed of the second vehicle. The second vehicle is a vehicle following the first vehicle. Because a vehicle in rail transport generally runs according to a predetermined plan, a speed of the vehicle and a position of the vehicle are related. For example, a speed of a vehicle between two platforms is generally high, and a speed of a vehicle that approaches or reaches a platform is generally low. Therefore, the distance threshold may alternatively be a function of a physical position of the second vehicle or a function of a trackside AP that is communicating with the second vehicle-mounted AP carried by the second vehicle. Similarly, because running of the second vehicle is closely related to that of the first vehicle, the distance threshold may alternatively be a function of the physical position of the first vehicle or a function of a trackside AP that is communicating with the first vehicle-mounted AP carried by the first vehicle. When the foregoing function is established, the distance threshold may be further adjusted with reference to a terrain factor, for example, according to a fact that the vehicle is on an open ground, in a mountainous area, or in a tunnel.

The physical position of the first vehicle may be represented by coordinates of the first vehicle in three-dimensional space, or may be represented by a distance on a track and to a particular point (for example, a start point of the track). The distance may be a spatial distance, or may be a length of extension along the track. For example, if the track is curved, a spatial distance between two points on the curved track is less than a length of extension between the two points along the track. No matter how a distance is defined, implementation of this embodiment of the present disclosure is not impeded. Data about the physical position of the first vehicle may come from outside a WLAN system, for example, from a train dispatch system, a subway monitoring center, or positioning data of the vehicle itself, such as Global Positioning System (GPS) data of the vehicle.

Data about the physical position of the first vehicle may alternatively come from a WLAN system itself. A device in the WLAN system may obtain some parameters from another device in the WLAN system to estimate the physical position of the first vehicle. The device in the WLAN system may be a controller, or may be a device other than the controller. The device other than the controller estimates the physical position of the first vehicle and then sends the data about the physical position to the controller.

For example, the device in the WLAN system may store a physical position of each trackside AP in advance. A vehicle-mounted AP on a vehicle generally selects to communicate with a trackside AP having a strongest signal. The trackside AP having the strongest signal is generally relatively close to the vehicle. Therefore, a physical position of a trackside AP that is communicating with the vehicle-mounted AP on the first vehicle may be used as the physical position of the first vehicle.

Further, the device in the WLAN system may consider more factors, for example, a speed of the first vehicle in order to estimate the physical position of the first vehicle more accurately. For example, the vehicle-mounted AP on the first vehicle is a first vehicle-mounted AP. Then, the physical position of the first vehicle may be estimated according to a physical position of a trackside AP of the multiple trackside APs that is communicating with the first vehicle-mounted AP, a radio link setup time, and a speed of the first vehicle. The radio link setup time is a time that a radio link is set up between the first vehicle-mounted AP and the trackside AP that is communicating with the first vehicle-mounted AP. For example, the physical position of the trackside AP that is communicating with the first vehicle-mounted AP is L meters, a radio link was set up T seconds ago between the first vehicle-mounted AP and the trackside AP that is communicating with the first vehicle-mounted AP, and a speed of the first vehicle is V meters/second. In this case, the physical position of the first vehicle is L+T*V meters.

The data about the speed of the first vehicle may come from outside the WLAN system, for example, from a train dispatch system, a subway monitoring center, or positioning data of the vehicle itself, such as GPS data of the vehicle. The data about the speed of the first vehicle may alternatively be estimated by a device in the WLAN system according to a history of trackside APs that communicate with the vehicle-mounted AP on the first vehicle. For example, a trackside AP that is communicating with the first vehicle-mounted AP at T1 seconds is an AP 1, and a physical position of the AP 1 is L1 meters, a trackside AP that is communicating with the first vehicle-mounted AP at T2 seconds is an AP 2, and a physical position of the AP 2 is L2 meters. In this case, a speed of the first vehicle is (L2−L1)/(T2−T1).

If the preset threshold is a quantity threshold, determining, by the controller, a to-be-changed trackside AP for a first vehicle, among the multiple trackside APs includes obtaining, by the controller, a trackside AP that is communicating with the first vehicle-mounted AP carried by the first vehicle, and using, as the to-be-changed trackside AP, a trackside AP that is behind the trackside AP that is communicating with the first vehicle-mounted AP carried by the first vehicle, where a distance between the trackside APs exceeds N. N is the quantity threshold. N may be a fixed value, or may be a variable value.

N may be a function of a speed of the second vehicle. N may alternatively be a function of a physical position of the second vehicle, or a function of a trackside AP that is communicating with a second vehicle-mounted AP carried by the second vehicle, or N may be a function of a physical position of the first vehicle, or a function of a trackside AP that is communicating with a first vehicle-mounted AP carried by the first vehicle.

There may be or was a radio link between the to-be-changed trackside AP for the first vehicle and the first vehicle-mounted AP carried by the first vehicle. A vehicle-mounted AP carried by a vehicle may set up respective radio links to multiple trackside APs. One of the radio links is used for communication between the vehicle-mounted AP and a trackside AP. A radio link between the vehicle-mounted AP and another trackside AP is a backup radio link. If a vehicle-mounted AP sets up a radio link to only one trackside AP, in a running history of a vehicle, the vehicle-mounted AP on the vehicle may have not set up radio links to all trackside APs by which the vehicle passed. Therefore, the to-be-changed trackside AP for the first vehicle did not necessarily set up a radio link to the first vehicle-mounted AP.

The second vehicle may be a vehicle that is running, or may be a vehicle that is to depart. If the second vehicle is a vehicle that is running following the first vehicle, the second channel is a current operating channel of the second vehicle-mounted AP carried by the second vehicle. If the second vehicle is a next vehicle that is to depart, the controller needs to determine the second channel as an operating channel of the second vehicle-mounted AP carried by the second vehicle after the second vehicle departs. The second channel may be sent to the second vehicle-mounted AP in non-WLAN manner, or may not need to be sent to the second vehicle-mounted AP. The controller needs only to control the to-be-changed trackside AP to change to the second channel. After the second vehicle departs, the second vehicle-mounted AP is started, and the second vehicle-mounted AP searches for a WLAN signal, finds that signal intensity of a signal on the second channel is the highest, and therefore sets an operating channel of the second vehicle-mounted AP to the second channel. After that, during an entire running course of the second vehicle, the second vehicle-mounted AP does not need to change its operating channel.

If the track includes multiple track branches, the second vehicle and the first vehicle may belong to different track branches. For example, in FIG. 3, the first vehicle belongs to (A3, D3, B3), and the second vehicle belongs to (A3, D3, C3). If the second channel that is specified by the controller for the second vehicle-mounted AP is different from only the first channel, it cannot be avoided that, after the second vehicle enters and runs in a segment (D3, C3), a channel of the second vehicle-mounted AP is the same as a channel of a vehicle-mounted AP on a vehicle preceding the second vehicle. Therefore, optionally, a respective branch channel set of available channels may be established for each track branch. The branch channel set is a track channel set for a track branch. An intersection set of branch channel sets for any two track branches is an empty set. Consequently, the second channel that is specified by the controller for the second vehicle-mounted AP is a channel in a branch channel set for a track branch to which the second vehicle belongs, and the second channel is different from an operating channel of a vehicle-mounted AP on a vehicle that precedes the second vehicle and that is in the track branch to which the second vehicle belongs.

If a track includes multiple track branches, but the first vehicle and the second vehicle belong to one track branch, the second channel that is specified by the controller for the second vehicle-mounted AP is different from an operating channel of a vehicle-mounted AP (that is, the first vehicle-mounted AP) of a vehicle (that is, the first vehicle) that precedes the second vehicle and that is in the track branch to which the second vehicle belongs.

If a track includes only one track branch, the branch channel set is a set of available channels for the track, and the second channel that is specified by the controller for the second vehicle-mounted AP is different from an operating channel of a vehicle-mounted AP (that is, the first vehicle-mounted AP) of a vehicle (that is, the first vehicle) that precedes the second vehicle and that is in the track branch (that is, the track) to which the second vehicle belongs.

It is not always necessary to establish a respective branch channel set of available channels for each track branch, provided that the second channel is different from an operating channel of a vehicle-mounted AP on a vehicle that precedes the second vehicle and that is in the track branch to which the second vehicle belongs. For example, in FIG. 2, there are two track branches (A2, C2, B2) and (A2, C2). The second vehicle and the first vehicle belong to (A2, C2, B2) and (A2, C2) respectively. The two track branches may use one branch channel set, that is, they have same available channel space. A quantity of elements in the branch channel set is greater than 2. The controller allocates operating channels in the branch channel set to vehicle-mounted APs according to a requirement that the second channel is different from an operating channel of a vehicle-mounted AP on a vehicle that precedes the second vehicle and that is in the track branch to which the second vehicle belongs. In this way, after the second vehicle enters a segment (C2, B2), it can still be ensured that the operating channel of the vehicle-mounted AP on the second vehicle is different from operating channels of vehicle-mounted APs on preceding and following vehicles. For example, the branch channel set in the foregoing case is (1, 2, 3, 4), and 1, 2, 3, and 4 are different channel identifiers. Vehicles that belong to (A2, C2, B2) and (A2, C2) depart alternately. In this case, the controller successively and cyclically allocates channels 1 and 3 for vehicles that belong to (A2, C2, B2) and successively and cyclically allocates channels 2 and 4 for vehicles that belong to (A2, C2).

The foregoing two track branches that belong to one track refer to track segments whose WLAN signals may interfere with each other. If two track segments are connected, but WLAN signals do not interfere with each other, the two track segments may be treated as two different tracks. In FIG. 3, for example, if some vehicles depart from a point A3 and finish running at a point B3, and other vehicles depart from a point D3 and finish running at a point C3, there are two track segments (A3, D3, B3) and (D3, C3) in FIG. 3. If WLAN signals of the two track segments may interfere with each other at the point D3, (A3, D3, B3) and (D3, C3) are two track branches of a fixed track (A3, D3, (B3, C3)). If WLAN signals of the two track segments do not interfere with each other at the point D3, for example, at D3, (A3, D3, B3) and (D3, C3) pass by two different levels of platforms and WLAN signal interference between (A3, D3, B3) and (D3, C3) is extremely low, (A3, D3, B3) and (D3, C3) are two fixed tracks that are independent of each other. For example, in a subway system in a metropolitan city, different platforms are generally used in a transfer station for multiple subway lines, and WLAN signal interference between the multiple subway lines is extremely low. Therefore, different subway lines are generally treated as different fixed tracks.

The track may include two or more independent tracks. Directions of two independent tracks of the two or more independent tracks may be the same or opposite. For example, a subway line in a subway system may include two physical tracks in opposite directions. If different tunnels and different platforms are used for the two physical tracks and consequently there is no WLAN signal interference between the two physical tracks, the two physical tracks may be treated as different tracks. If one tunnel and one platform are used for the two physical tracks, WLAN signals of the two physical tracks may interfere with each other. Therefore, the two physical tracks are a first independent track and a second independent track that are of one track. Two sets of trackside APs are installed along the two independent tracks respectively. Either set of trackside APs has respective available channel space, and the two blocks of available channel space are independent of each other. That is, if the track includes a first independent track and a second independent track, and directions of the first independent track and the second independent track are opposite, a set of available channels for multiple trackside APs that are installed along the first independent track is a first track channel set, a set of available channels for multiple trackside APs that are installed along the second independent track is a second track channel set, and an intersection set of the first track channel set and the second track channel set is an empty set. Correspondingly, operating channels of vehicle-mounted APs on vehicles that belong to different independent tracks are specified in corresponding track channel sets.

The second channel has been specified by the controller before the second vehicle departs, and during running of the second vehicle, the second channel is the current operating channel of the second vehicle-mounted AP carried by the second vehicle. Therefore, during an entire running course of the second vehicle, the second vehicle-mounted AP does not need to change its operating channel. That is, the operating channel of the second vehicle-mounted AP is specified by the controller. The controller may specify, in a track channel set, an operating channel for the second vehicle-mounted AP. The track channel set may be stored in the controller, or may be stored in an independent storage device.

The vehicle-mounted APs and the trackside APs may be connected using a wireless mesh network. That is, the WLAN is a wireless mesh network. The vehicle-mounted APs and the trackside APs may alternatively be connected using a wireless distribution system (WDS).

If the WLAN is a wireless mesh network, multiple trackside APs that are installed along the first independent track and multiple trackside APs that are installed along the second independent track may belong to different MBSS respectively. That is, an MBSS for the first independent track is a first MBSS, and an MBSS for the second independent track is a second MBSS. Correspondingly, when a vehicle runs to an endpoint along the first independent track and turns to run in an opposite direction, the controller instructs a vehicle-mounted AP on the vehicle to be handed off from the first MBSS to the second MBSS.

The instructing a vehicle-mounted AP on the vehicle to be handed off from the first MBSS to the second MBSS may be implemented in multiple manners. For example, each vehicle has only one vehicle-mounted AP, and the controller sends a profile about the second MBSS to the vehicle-mounted AP and instructs the vehicle-mounted AP to be handed off to the second MBSS. Each vehicle may alternatively have two (or more) vehicle-mounted APs, and configuration of each vehicle-mounted AP is completed according to a different MBSS. For example, the vehicle carries a third vehicle-mounted AP and a fourth vehicle-mounted AP, an MBSS for the third vehicle-mounted AP is the first MBSS, and an MBSS for the fourth vehicle-mounted AP is the second MBSS. When the vehicle runs along the first independent track, the third vehicle-mounted AP runs, and the fourth vehicle-mounted AP stops running. When the vehicle runs to an endpoint along the first independent track, the controller instructs the fourth vehicle-mounted AP to run and instructs the third vehicle-mounted AP to stop running. The running and stopping running herein may be enabling and disabling of the entire vehicle-mounted AP device, or may be enabling and disabling of a WLAN function of the vehicle-mounted AP.

Figure 5:
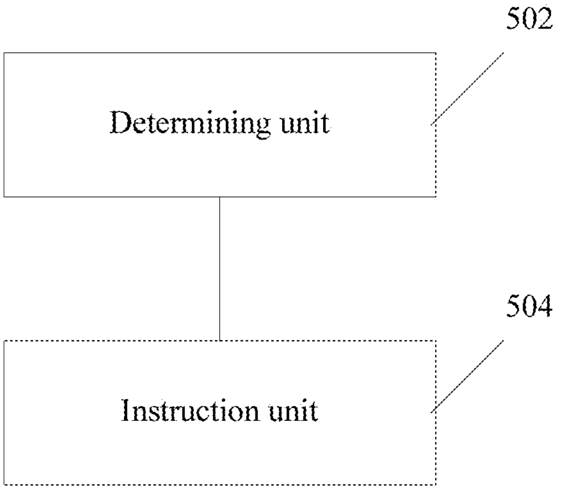
FIG. 5 is a schematic diagram of a channel management device for a WLAN in rail transport according to an embodiment of the present disclosure.

FIG. 5 is a schematic diagram of a channel management device for a WLAN in rail transport according to an embodiment of the present disclosure. The channel management device includes a determining unit 502 and an instruction unit 504.

The determining unit 502 is configured to determine a to-be-changed trackside AP for a first vehicle, among multiple trackside APs, where the to-be-changed trackside AP for the first vehicle is a trackside AP that is behind the first vehicle according to a running direction of the first vehicle and whose distance to the first vehicle exceeds a preset threshold, a current operating channel of the to-be-changed trackside AP for the first vehicle is a first channel, the first channel is an operating channel of a first vehicle-mounted AP carried by the first vehicle, the multiple trackside APs are installed along a track, at least two vehicles run on the track, and each of the at least two vehicles carries a respective vehicle-mounted AP.

The instruction unit 504 is configured to instruct the to-be-changed trackside AP for the first vehicle to change the operating channel to a second channel, where the second channel is an operating channel of a second vehicle-mounted AP carried by a second vehicle, the second vehicle is a vehicle following the first vehicle, the second channel is different from the first channel, and the first vehicle and the second vehicle belong to one independent track.

The channel management device may be implemented by a controller.

Each vehicle may carry one or more vehicle-mounted APs. If multiple vehicle-mounted APs are carried by one vehicle, the multiple vehicle-mounted APs may use one operating channel, or may use different operating channels. If the multiple vehicle-mounted APs use one operating channel, the vehicle-mounted APs may be considered as one vehicle-mounted AP. If the multiple vehicle-mounted APs use different operating channels, the vehicle-mounted APs carried by one vehicle that use different operating channels may be considered as vehicle-mounted APs carried by different vehicles. Vehicle-mounted APs carried by one vehicle that use different operating channels may be considered as vehicle-mounted APs carried by different vehicles on one independent track, or may be considered as vehicle-mounted APs carried by vehicles on different independent tracks. For example, if vehicle-mounted APs carried by one vehicle that use different operating channels are considered as vehicle-mounted APs carried by vehicles on different independent tracks, two sets of trackside APs are installed beside a track. Either set of trackside APs has respective available channel space, and the two blocks of available channel space are independent of each other. That is, the track is considered to include a third independent track and a fourth independent track. Directions of the third independent track and the fourth independent track are the same. A set of available channels for multiple trackside APs that are installed along the third independent track is a third track channel set. A set of available channels for multiple trackside APs that are installed along the fourth independent track is a fourth track channel set. An intersection set of the third track channel set and the fourth track channel set is an empty set. Correspondingly, the vehicle carries two vehicle-mounted APs that belong to the third independent track and the fourth independent track respectively, and operating channels of vehicle-mounted APs that belong to different independent tracks are specified in corresponding track channel sets. With the foregoing deployment, total bandwidth of vehicle-mounted APs on vehicles can be increased.

To shorten a time for handing over a vehicle-mounted AP between trackside APs, an operating channel of the vehicle-mounted AP needs to be kept unchanged in an entire running course of a vehicle, and a trackside AP needs to use an operating channel the same as that of the vehicle-mounted AP on the vehicle when the vehicle approaches the trackside AP. In this case, the channel management device instructs, according to a position of the vehicle, a trackside AP that is behind the vehicle and far from the vehicle, to switch to an operating channel used by a next vehicle. The trackside AP that needs to be instructed by the channel management device to switch to the operating channel used by the next vehicle is a to-be-changed trackside AP. An example is used in which a channel of a trackside AP between the first vehicle and the second vehicle is changed. The to-be-changed trackside AP is a to-be-changed trackside AP for the first vehicle, and the to-be-changed trackside AP for the first vehicle is a trackside AP that is behind the first vehicle and whose distance to the first vehicle exceeds a preset threshold. The preset threshold may be a distance threshold, or may be a quantity threshold. The preset threshold may be related to a distance between two vehicles on the track, for example, about one half or one third of the distance between two vehicles on the track, or may be a quantity of trackside APs that represents the foregoing distance.

If the preset threshold is a distance threshold, determining, by the determining unit 502, a to-be-changed trackside AP for a first vehicle, among multiple trackside APs includes obtaining, by the determining unit 502, a physical position of the first vehicle, and determining, as the to-be-changed trackside AP, a trackside AP of the multiple trackside APs that is behind the first vehicle, whose current operating channel is the first channel, and from whose physical position a distance to the physical position of the first vehicle is greater than the distance threshold. The distance threshold may be a fixed value, or may be a variable value.

A speed at which the vehicle runs on the track is variable. For example, when the vehicle stops by a platform, the speed of the vehicle is zero. A channel change takes time, and a vehicle that is running at a high speed requires that a front trackside AP farther from the vehicle change a channel in advance. Therefore, it may be considered that the distance threshold is set to be a function of a speed of the second vehicle. The second vehicle is a vehicle following the first vehicle. Because a vehicle in rail transport generally runs according to a predetermined plan, a speed of the vehicle and a position of the vehicle are related. For example, a speed of a vehicle between two platforms is generally high, and a speed of a vehicle that approaches or reaches a platform is generally low. Therefore, the distance threshold may alternatively be a function of a physical position of the second vehicle or a function of a trackside AP that is communicating with the second vehicle-mounted AP carried by the second vehicle. Similarly, because running of the second vehicle is closely related to that of the first vehicle, the distance threshold may alternatively be a function of the physical position of the first vehicle or a function of a trackside AP that is communicating with the first vehicle-mounted AP carried by the first vehicle. When the foregoing function is established, the distance threshold may be further adjusted with reference to a terrain factor, for example, according to a fact that the vehicle is on an open ground, in a mountainous area, or in a tunnel.

The physical position of the first vehicle may be represented by coordinates of the first vehicle in three-dimensional space, or may be represented by a distance on a track and to a particular point (for example, a start point of the track). The distance may be a spatial distance, or may be a length of extension along the track. For example, if the track is curved, a spatial distance between two points on the curved track is less than a length of extension between the two points along the track. No matter how a distance is defined, implementation of this embodiment of the present disclosure is not impeded. Data about the physical position of the first vehicle may come from outside a WLAN system, for example, from a train dispatch system, a subway monitoring center, or positioning data of the vehicle itself, such as GPS data of the vehicle.

Data about the physical position of the first vehicle may alternatively come from a WLAN system itself. A device in the WLAN system may obtain some parameters from another device in the WLAN system to estimate the physical position of the first vehicle. The device in the WLAN system may be a controller, or may be a device other than the controller. The device other than the controller estimates the physical position of the first vehicle and then sends the data about the physical position to the controller.

For example, the device in the WLAN system may store a physical position of each trackside AP in advance. A vehicle-mounted AP on a vehicle generally selects to communicate with a trackside AP having a strongest signal. The trackside AP having the strongest signal is generally relatively close to the vehicle. Therefore, a physical position of a trackside AP that is communicating with the vehicle-mounted AP on the first vehicle may be used as the physical position of the first vehicle.

Further, the device in the WLAN system may consider more factors, for example, a speed of the first vehicle in order to estimate the physical position of the first vehicle more accurately. For example, the vehicle-mounted AP on the first vehicle is a first vehicle-mounted AP. Then, the physical position of the first vehicle may be estimated according to a physical position of a trackside AP of the multiple trackside APs that is communicating with the first vehicle-mounted AP, a radio link setup time, and a speed of the first vehicle. The radio link setup time is a time that a radio link is set up between the first vehicle-mounted AP and the trackside AP that is communicating with the first vehicle-mounted AP. For example, the physical position of the trackside AP that is communicating with the first vehicle-mounted AP is L meters, a radio link was set up T seconds ago between the first vehicle-mounted AP and the trackside AP that is communicating with the first vehicle-mounted AP, and a speed of the first vehicle is V meters/second. In this case, the physical position of the first vehicle is L+T*V meters.

The data about the speed of the first vehicle may come from outside the WLAN system, for example, from a train dispatch system, a subway monitoring center, or positioning data of the vehicle itself, such as GPS data of the vehicle. The data about the speed of the first vehicle may alternatively be estimated by a device in the WLAN system according to a history of trackside APs that communicate with the vehicle-mounted AP on the first vehicle. For example, a trackside AP that is communicating with the first vehicle-mounted AP at T1 seconds is an AP 1, and a physical position of the AP 1 is L1 meters, a trackside AP that is communicating with the first vehicle-mounted AP at T2 seconds is an AP 2, and a physical position of the AP 2 is L2 meters. In this case, a speed of the first vehicle is (L2−L1)/(T2−T1).

If the preset threshold is a quantity threshold, determining, by the determining unit 502, a to-be-changed trackside AP for a first vehicle, among the multiple trackside APs includes obtaining, by the determining unit 502, a trackside AP that is communicating with the first vehicle-mounted AP carried by the first vehicle, and setting, as the to-be-changed trackside AP, a trackside AP that is behind the trackside AP that is communicating with the first vehicle-mounted AP carried by the first vehicle, where a distance between the trackside APs exceeds N. N is the quantity threshold. N may be a fixed value, or may be a variable value.

N may be a function of a speed of the second vehicle. N may alternatively be a function of a physical position of the second vehicle, a function of a trackside AP that is communicating with a second vehicle-mounted AP carried by the second vehicle, N may be a function of a physical position of the first vehicle, or a function of a trackside AP that is communicating with a first vehicle-mounted AP carried by the first vehicle.

There may be or was a radio link between the to-be-changed trackside AP for the first vehicle and the first vehicle-mounted AP carried by the first vehicle. A vehicle-mounted AP carried by a vehicle may set up respective radio links to multiple trackside APs. One of the radio links is used for communication between the vehicle-mounted AP and a trackside AP. A radio link between the vehicle-mounted AP and another trackside AP is a backup radio link. If a vehicle-mounted AP sets up a radio link to only one trackside AP, in a running history of a vehicle, the vehicle-mounted AP on the vehicle may have not set up radio links to all trackside APs by which the vehicle passed. Therefore, the to-be-changed trackside AP for the first vehicle did not necessarily set up a radio link to the first vehicle-mounted AP.

The second vehicle may be a vehicle that is running, or may be a vehicle that is to depart. If the second vehicle is a vehicle that is running following the first vehicle, the second channel is a current operating channel of the second vehicle-mounted AP carried by the second vehicle. If the second vehicle is a next vehicle that is to depart, the channel management device needs to determine the second channel as an operating channel of the second vehicle-mounted AP carried by the second vehicle after the second vehicle departs. The second channel may be sent to the second vehicle-mounted AP in non-WLAN manner, or may not need to be sent to the second vehicle-mounted AP. The channel management device needs only to control the to-be-changed trackside AP to change to the second channel. After the second vehicle departs, the second vehicle-mounted AP is started, and the second vehicle-mounted AP searches for a WLAN signal, finds that signal intensity of a signal on the second channel is the highest, and therefore sets an operating channel of the second vehicle-mounted AP to the second channel. After that, during an entire running course of the second vehicle, the second vehicle-mounted AP does not need to change its operating channel.

If the track includes multiple track branches, the second vehicle and the first vehicle may belong to different track branches. For example, in FIG. 3, the first vehicle belongs to (A3, D3, B3), and the second vehicle belongs to (A3, D3, C3). If the second channel that is specified by the channel management device for the second vehicle-mounted AP is different from only the first channel, it cannot be avoided that, after the second vehicle enters and runs in a segment (D3, C3), a channel of the second vehicle-mounted AP is the same as a channel of a vehicle-mounted AP on a vehicle preceding the second vehicle. Therefore, optionally, a respective branch channel set of available channels may be established for each track branch. The branch channel set is a track channel set for a track branch. An intersection set of branch channel sets for any two track branches is an empty set. Consequently, the second channel that is specified by the channel management device for the second vehicle-mounted AP is a channel in a branch channel set for a track branch to which the second vehicle belongs, and the second channel is different from an operating channel of a vehicle-mounted AP on a vehicle that precedes the second vehicle and that is in the track branch to which the second vehicle belongs.

If a track includes multiple track branches, but the first vehicle and the second vehicle belong to one track branch, the second channel that is specified by the instruction unit 504 for the second vehicle-mounted AP is different from an operating channel of a vehicle-mounted AP (that is, the first vehicle-mounted AP) of a vehicle (that is, the first vehicle) that precedes the second vehicle and that is in the track branch to which the second vehicle belongs.

If a track includes only one track branch, the branch channel set is a set of available channels for the track, and the second channel that is specified by the instruction unit 504 for the second vehicle-mounted AP is different from an operating channel of a vehicle-mounted AP (that is, the first vehicle-mounted AP) of a vehicle (that is, the first vehicle) that precedes the second vehicle and that is in the track branch (that is, the track) to which the second vehicle belongs.

It is not always necessary to establish a respective branch channel set of available channels for each track branch, provided that the second channel is different from an operating channel of a vehicle-mounted AP on a vehicle that precedes the second vehicle and that is in the track branch to which the second vehicle belongs. For example, in FIG. 2, there are two track branches (A2, C2, B2) and (A2, C2). The second vehicle and the first vehicle belong to (A2, C2, B2) and (A2, C2) respectively. The two track branches may use one branch channel set, that is, they have same available channel space. A quantity of elements in the branch channel set is greater than 2. The controller allocates operating channels in the branch channel set to vehicle-mounted APs according to a requirement that the second channel is different from an operating channel of a vehicle-mounted AP on a vehicle that precedes the second vehicle and that is in the track branch to which the second vehicle belongs. In this way, after the second vehicle enters a segment (C2, B2), it can still be ensured that the operating channel of the vehicle-mounted AP on the second vehicle is different from operating channels of vehicle-mounted APs on preceding and following vehicles. For example, the branch channel set in the foregoing case is (1, 2, 3, 4), and 1, 2, 3, and 4 are different channel identifiers. Vehicles that belong to (A2, C2, B2) and (A2, C2) depart alternately. In this case, the channel management device successively and cyclically allocates channels 1 and 3 for vehicles that belong to (A2, C2, B2) and successively and cyclically allocates channels 2 and 4 for vehicles that belong to (A2, C2).

The foregoing two track branches that belong to one track refer to track segments whose WLAN signals may interfere with each other. If two track segments are connected, but WLAN signals do not interfere with each other, the two track segments may be treated as two different tracks. In FIG. 3, for example, if some vehicles depart from a point A3 and finish running at a point B3, and other vehicles depart from a point D3 and finish running at a point C3, there are two track segments (A3, D3, B3) and (D3, C3) in FIG. 3. If WLAN signals of the two track segments may interfere with each other at the point D3, (A3, D3, B3) and (D3, C3) are two track branches of a fixed track (A3, D3, (B3, C3)). If WLAN signals of the two track segments do not interfere with each other at the point D3, for example, at D3, (A3, D3, B3) and (D3, C3) pass by two different levels of platforms and WLAN signal interference between (A3, D3, B3) and (D3, C3) is extremely low, (A3, D3, B3) and (D3, C3) are two fixed tracks that are independent of each other. For example, in a subway system in a metropolitan city, different platforms are generally used in a transfer station for multiple subway lines, and WLAN signal interference between the multiple subway lines is extremely low. Therefore, different subway lines are generally treated as different fixed tracks.

The track may include two or more independent tracks. Directions of two independent tracks of the two or more independent tracks may be the same or opposite. For example, a subway line in a subway system may include two physical tracks in opposite directions. If different tunnels and different platforms are used for the two physical tracks and consequently there is no WLAN signal interference between the two physical tracks, the two physical tracks may be treated as different tracks. If one tunnel and one platform are used for the two physical tracks, WLAN signals of the two physical tracks may interfere with each other. Therefore, the two physical tracks are a first independent track and a second independent track that are of one track. Two sets of trackside APs are installed along the two independent tracks respectively. Either set of trackside APs has respective available channel space, and the two blocks of available channel space are independent of each other. That is, if the track includes a first independent track and a second independent track, and directions of the first independent track and the second independent track are opposite, a set of available channels for multiple trackside APs that are installed along the first independent track is a first track channel set, a set of available channels for multiple trackside APs that are installed along the second independent track is a second track channel set, and an intersection set of the first track channel set and the second track channel set is an empty set. Correspondingly, operating channels of vehicle-mounted APs on vehicles that belong to different independent tracks are specified in corresponding track channel sets.

The second channel has been specified by the channel management device before the second vehicle departs, and during running of the second vehicle, the second channel is the current operating channel of the second vehicle-mounted AP carried by the second vehicle. Therefore, during an entire running course of the second vehicle, the second vehicle-mounted AP does not need to change its operating channel. That is, the operating channel of the second vehicle-mounted AP is specified by the channel management device. The channel management device may specify, in a track channel set, an operating channel for the second vehicle-mounted AP. The track channel set may be stored in the controller for implementing the channel management device, or may be stored in an independent storage device.

The vehicle-mounted APs and the trackside APs may be connected using a wireless mesh network. That is, the WLAN is a wireless mesh network. The vehicle-mounted APs and the trackside APs may alternatively be connected using a WDS.

If the WLAN is a wireless mesh network, multiple trackside APs that are installed along the first independent track and multiple trackside APs that are installed along the second independent track may belong to different MBSSs respectively. That is, an MBSS for the first independent track is a first MBSS, and an MBSS for the second independent track is a second MBSS. Correspondingly, when a vehicle runs to an endpoint along the first independent track and turns to run in an opposite direction, the instruction unit 504 instructs a vehicle-mounted AP on the vehicle to be handed off from the first MBSS to the second MBSS.

The instructing a vehicle-mounted AP on the vehicle to be handed off from the first MBSS to the second MBSS may be implemented in multiple manners. For example, each vehicle has only one vehicle-mounted AP, and the instruction unit 504 sends a profile about the second MBSS to the vehicle-mounted AP and instructs the vehicle-mounted AP to be handed off to the second MBSS. Each vehicle may alternatively have two (or more) vehicle-mounted APs, and configuration of each vehicle-mounted AP is completed according to a different MBSS. For example, the vehicle carries a third vehicle-mounted AP and a fourth vehicle-mounted AP, an MBSS for the third vehicle-mounted AP is the first MBSS, and an MBSS for the fourth vehicle-mounted AP is the second MBSS. When the vehicle runs along the first independent track, the third vehicle-mounted AP runs, and the fourth vehicle-mounted AP stops running. When the vehicle runs to an endpoint along the first independent track, the instruction unit 504 instructs the fourth vehicle-mounted AP to run and instructs the third vehicle-mounted AP to stop running. The running and stopping running herein may be enabling and disabling of the entire vehicle-mounted AP device, or may be enabling and disabling of a WLAN function of the vehicle-mounted AP.

Figure 6:
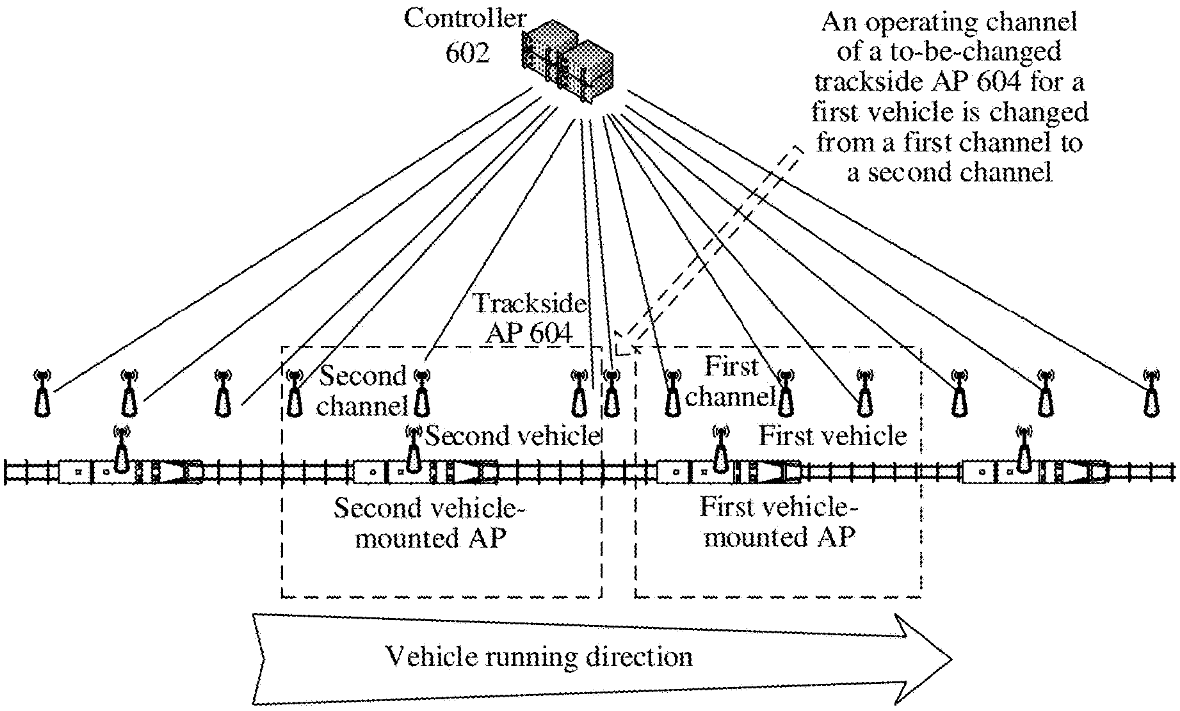
FIG. 6 is an architectural diagram of a WLAN system in rail transport according to an embodiment of the present disclosure.

FIG. 6 is an architectural diagram of a WLAN system in rail transport according to an embodiment of the present disclosure. The WLAN system is built in a rail transport system. In the rail transport system, at least two vehicles run on a track. Each of the at least two vehicles carries a respective vehicle-mounted AP. The WLAN system includes a controller 602 and multiple trackside APs 604. A vehicle-mounted AP on each vehicle may also be a device in the WLAN system. Vehicle-mounted APs and trackside APs 604 may be connected using a standard WLAN protocol. Therefore, the vehicle-mounted APs may not be constructed together with the WLAN system, but mounted on vehicles by vehicle providers. The WLAN system may further include another device, for example, a device dedicated to estimating a physical position of a vehicle, a storage device, a train dispatch system, or a subway monitoring center. The storage device may store parameters (for example, positions, powers, or optional track channel sets) of the trackside Aps 604, elements in track channel sets, track topology data, data about surrounding terrains of the track, positions of platforms, a vehicle running schedule, and the like. The data may alternatively be stored by the controller 602.

The multiple trackside APs 604 are installed along the track. The track may be in any shape. The controller 602 may be a server, may be a network device such as a router or a network switch, or may be a control center including multiple devices. The controller 602 is connected to each of the multiple trackside APs 604. The controller 602 may be connected to the trackside APs 604 using a wired network, a wireless network, or a hybrid wired/wireless network. The controller 602 may be directly connected to each trackside AP 604, or may be connected to one of the multiple trackside APs 604 via another trackside AP 604 of the multiple trackside APs 604. The controller 602 may be further connected to vehicle-mounted APs via the trackside APs 604. The controller 602 may control APs (including the trackside APs 604 and the vehicle-mounted APs) using a proprietary protocol or a standard protocol.

A vehicle-mounted AP is configured to connect to a trackside AP 604 using a radio link in order to provide a network connection for a terminal device on a vehicle. The vehicle-mounted AP may directly provide a WLAN connection, or may be connected to another network device (for example, another AP, a network switch, a router, or a small cell base station) on the vehicle, or a vehicle network including network devices, to provide, for the other network device on the vehicle or the vehicle network, a trackside AP 604 and further a capability of accessing a network using the trackside AP 604. The other network device on the vehicle or the vehicle network then provides a network connection for the terminal device on the vehicle.

Each of the multiple trackside APs 604 is configured to provide a radio link connected to a vehicle-mounted AP.

The controller 602 is configured to determine a to-be-changed trackside AP 604 for a first vehicle, among the multiple trackside APs 604, where the to-be-changed trackside AP 604 for the first vehicle is a trackside AP 604 that is behind the first vehicle according to a running direction of the first vehicle and whose distance to the first vehicle exceeds a preset threshold, a current operating channel of the to-be-changed trackside AP 604 for the first vehicle is a first channel, and the first channel is an operating channel of a first vehicle-mounted AP carried by the first vehicle. The controller 602 is further configured to instruct the to-be-changed trackside AP 604 for the first vehicle to change the operating channel to a second channel, where the second channel is an operating channel of a second vehicle-mounted AP carried by a second vehicle, the second vehicle is a vehicle following the first vehicle, the second channel is different from the first channel, and the first vehicle and the second vehicle belong to one independent track.

Each vehicle may carry one or more vehicle-mounted APs. If multiple vehicle-mounted APs are carried by one vehicle, the multiple vehicle-mounted APs may use one operating channel, or may use different operating channels. If the multiple vehicle-mounted APs use one operating channel, the vehicle-mounted APs may be considered as one vehicle-mounted AP. If the multiple vehicle-mounted APs use different operating channels, the vehicle-mounted APs carried by one vehicle that use different operating channels may be considered as vehicle-mounted APs carried by different vehicles. Vehicle-mounted APs carried by one vehicle that use different operating channels may be considered as vehicle-mounted APs carried by different vehicles on one independent track, or may be considered as vehicle-mounted APs carried by vehicles on different independent tracks. For example, if vehicle-mounted APs carried by one vehicle that use different operating channels are considered as vehicle-mounted APs carried by vehicles on different independent tracks, two sets of trackside Aps 604 are installed beside a track. Either set of trackside Aps 604 has respective available channel space, and the two blocks of available channel space are independent of each other. That is, the track is considered to include a third independent track and a fourth independent track. Directions of the third independent track and the fourth independent track are the same. A set of available channels for multiple trackside APs 604 that are installed along the third independent track is a third track channel set. A set of available channels for multiple trackside APs 604 that are installed along the fourth independent track is a fourth track channel set. An intersection set of the third track channel set and the fourth track channel set is an empty set. Correspondingly, the vehicle carries two vehicle-mounted APs that belong to the third independent track and the fourth independent track respectively, and operating channels of vehicle-mounted APs that belong to different independent tracks are specified in corresponding track channel sets. With the foregoing deployment, total bandwidth of vehicle-mounted APs on vehicles can be increased.

To shorten a time for handing over a vehicle-mounted AP between trackside Aps 604, an operating channel of the vehicle-mounted AP needs to be kept unchanged in an entire running course of a vehicle, and a trackside AP 604 needs to use an operating channel the same as that of the vehicle-mounted AP on the vehicle when the vehicle approaches the trackside AP 604. In this case, the controller 602 instructs, according to a position of the vehicle, a trackside AP 604 that is behind the vehicle and far from the vehicle, to switch to an operating channel used by a next vehicle. The trackside AP 604 that needs to be instructed by the controller 602 to switch to the operating channel used by the next vehicle is a to-be-changed trackside AP 604. An example is used in which a channel of a trackside AP 604 between the first vehicle and the second vehicle is changed. The to-be-changed trackside AP 604 is a to-be-changed trackside AP 604 for the first vehicle, and the to-be-changed trackside AP 604 for the first vehicle is a trackside AP 604 that is behind the first vehicle and whose distance to the first vehicle exceeds a preset threshold. The preset threshold may be a distance threshold, or may be a quantity threshold. The preset threshold may be related to a distance between two vehicles on the track, for example, about one half or one third of the distance between two vehicles on the track, or may be a quantity of trackside APs that represents the foregoing distance.

If the preset threshold is a distance threshold, determining, by the controller 602, a to-be-changed trackside AP for a first vehicle, among the multiple trackside APs 604 includes obtaining, by the controller 602, a physical position of the first vehicle, and determining, as the to-be-changed trackside AP, a trackside AP of the multiple trackside APs 604 that is behind the first vehicle, whose current operating channel is the first channel, and from whose physical position a distance to the physical position of the first vehicle is greater than the distance threshold. The distance threshold may be a fixed value, or may be a variable value.

A speed at which the vehicle runs on the track is variable. For example, when the vehicle stops by a platform, the speed of the vehicle is zero. A channel change takes time, and a vehicle that is running at a high speed requires that a front trackside AP 604 farther from the vehicle change a channel in advance. Therefore, it may be considered that the distance threshold is set to be a function of a speed of the second vehicle. The second vehicle is a vehicle following the first vehicle. Because a vehicle in rail transport generally runs according to a predetermined plan, a speed of the vehicle and a position of the vehicle are related. For example, a speed of a vehicle between two platforms is generally high, and a speed of a vehicle that approaches or reaches a platform is generally low. Therefore, the distance threshold may alternatively be a function of a physical position of the second vehicle or a function of a trackside AP that is communicating with the second vehicle-mounted AP carried by the second vehicle. Similarly, because running of the second vehicle is closely related to that of the first vehicle, the distance threshold may alternatively be a function of the physical position of the first vehicle or a function of a trackside AP that is communicating with the first vehicle-mounted AP carried by the first vehicle. When the foregoing function is established, the distance threshold may be further adjusted with reference to a terrain factor, for example, according to a fact that the vehicle is on an open ground, in a mountainous area, or in a tunnel.

The physical position of the first vehicle may be represented by coordinates of the first vehicle in three-dimensional space, or may be represented by a distance on a track and to a particular point (for example, a start point of the track). The distance may be a spatial distance, or may be a length of extension along the track. For example, if the track is curved, a spatial distance between two points on the curved track is less than a length of extension between the two points along the track. No matter how a distance is defined, implementation of this embodiment of the present disclosure is not impeded. Data about the physical position of the first vehicle may come from outside the WLAN system, for example, from a train dispatch system, a subway monitoring center, or positioning data of the vehicle itself, such as GPS data of the vehicle.

Data about the physical position of the first vehicle may alternatively come from a WLAN system itself. A device in the WLAN system may obtain some parameters from another device in the WLAN system to estimate the physical position of the first vehicle. The device in the WLAN system may be a controller 602 or a device other than the controller 602. The device other than the controller 602 estimates the physical position of the first vehicle and then sends the data about the physical position to the controller 602.

For example, the device in the WLAN system may store a physical position of each trackside AP in advance. A vehicle-mounted AP on a vehicle generally selects to communicate with a trackside AP having a strongest signal. The trackside AP having the strongest signal is generally relatively close to the vehicle. Therefore, a physical position of a trackside AP that is communicating with the vehicle-mounted AP on the first vehicle may be used as the physical position of the first vehicle.

Further, the device in the WLAN system may consider more factors, for example, a speed of the first vehicle in order to estimate the physical position of the first vehicle more accurately. For example, the vehicle-mounted AP on the first vehicle is a first vehicle-mounted AP. Then, the physical position of the first vehicle may be estimated according to a physical position of a trackside AP 604 of the multiple trackside APs 604 that is communicating with the first vehicle-mounted AP, a radio link setup time, and a speed of the first vehicle. The radio link setup time is a time that a radio link is set up between the first vehicle-mounted AP and the trackside AP 604 that is communicating with the first vehicle-mounted AP. For example, the physical position of the trackside AP 604 that is communicating with the first vehicle-mounted AP is L meters, a radio link was set up T seconds ago between the first vehicle-mounted AP and the trackside AP 604 that is communicating with the first vehicle-mounted AP, and a speed of the first vehicle is V meters/second. In this case, the physical position of the first vehicle is L+T*V meters.

The data about the speed of the first vehicle may come from outside the WLAN system, for example, from a train dispatch system, a subway monitoring center, or positioning data of the vehicle itself, such as GPS data of the vehicle. The data about the speed of the first vehicle may alternatively be estimated by a device in the WLAN system according to a history of trackside Aps 604 that communicate with the vehicle-mounted AP on the first vehicle. For example, a trackside AP 604 that is communicating with the first vehicle-mounted AP at T1 seconds is an AP 1, and a physical position of the AP 1 is L1 meters, a trackside AP 604 that is communicating with the first vehicle-mounted AP at T2 seconds is an AP 2, and a physical position of the AP 2 is L2 meters. In this case, a speed of the first vehicle is (L2−L1)/(T2−T1).

If the preset threshold is a quantity threshold, determining, by the controller 602, a to-be-changed trackside AP 604 for a first vehicle, among the multiple trackside APs 604 includes obtaining, by the controller 602, a trackside AP 604 that is communicating with the first vehicle-mounted AP carried by the first vehicle, and using, as the to-be-changed trackside AP 604, a trackside AP 604 that is behind the trackside AP 604 that is communicating with the first vehicle-mounted AP carried by the first vehicle, where a distance between the trackside APs 604 exceeds N. N is the quantity threshold. N may be a fixed value, or may be a variable value.

N may be a function of a speed of the second vehicle. N may alternatively be a function of a physical position of the second vehicle, a function of a trackside AP 604 that is communicating with a second vehicle-mounted AP carried by the second vehicle, N may be a function of a physical position of the first vehicle, or a function of a trackside AP that is communicating with a first vehicle-mounted AP carried by the first vehicle.

There may be or was a radio link between the to-be-changed trackside AP 604 for the first vehicle and the first vehicle-mounted AP carried by the first vehicle. A vehicle-mounted AP carried by a vehicle may set up respective radio links to multiple trackside Aps 604. One of the radio links is used for communication between the vehicle-mounted AP and a trackside AP 604. A radio link between the vehicle-mounted AP and another trackside AP 604 is a backup radio link. If a vehicle-mounted AP sets up a radio link to only one trackside AP 604, in a running history of a vehicle, the vehicle-mounted AP on the vehicle may have not set up radio links to all trackside APs 604 by which the vehicle passed. Therefore, the to-be-changed trackside AP 604 for the first vehicle did not necessarily set up a radio link to the first vehicle-mounted AP.

The second vehicle may be a vehicle that is running, or may be a vehicle that is to depart. If the second vehicle is a vehicle that is running following the first vehicle, the second channel is a current operating channel of the second vehicle-mounted AP carried by the second vehicle. If the second vehicle is a next vehicle that is to depart, the controller 602 needs to determine the second channel as an operating channel of the second vehicle-mounted AP carried by the second vehicle after the second vehicle departs. The second channel may be sent to the second vehicle-mounted AP in non-WLAN manner, or may not need to be sent to the second vehicle-mounted AP. The controller 602 needs only to control the to-be-changed trackside AP 604 to change to the second channel. After the second vehicle departs, the second vehicle-mounted AP is started, and the second vehicle-mounted AP searches for a WLAN signal, finds that signal intensity of a signal on the second channel is the highest, and therefore sets an operating channel of the second vehicle-mounted AP to the second channel. After that, during an entire running course of the second vehicle, the second vehicle-mounted AP does not need to change its operating channel.

If the track includes multiple track branches, the second vehicle and the first vehicle may belong to different track branches. For example, in FIG. 3, the first vehicle belongs to (A3, D3, B3), and the second vehicle belongs to (A3, D3, C3). If the second channel that is specified by the controller 602 for the second vehicle-mounted AP is different from only the first channel, it cannot be avoided that, after the second vehicle enters and runs in a segment (D3, C3), a channel of the second vehicle-mounted AP is the same as a channel of a vehicle-mounted AP on a vehicle preceding the second vehicle. Therefore, optionally, a respective branch channel set of available channels may be established for each track branch. The branch channel set is a track channel set for a track branch. An intersection set of branch channel sets for any two track branches is an empty set. Consequently, the second channel that is specified by the controller 602 for the second vehicle-mounted AP is a channel in a branch channel set for a track branch to which the second vehicle belongs, and the second channel is different from an operating channel of a vehicle-mounted AP on a vehicle that precedes the second vehicle and that is in the track branch to which the second vehicle belongs.

If a track includes multiple track branches, but the first vehicle and the second vehicle belong to one track branch, the second channel that is specified by the controller 602 for the second vehicle-mounted AP is different from an operating channel of a vehicle-mounted AP (that is, the first vehicle-mounted AP) of a vehicle (that is, the first vehicle) that precedes the second vehicle and that is in the track branch to which the second vehicle belongs.

If a track includes only one track branch, the branch channel set is a set of available channels for the track, and the second channel that is specified by the controller 602 for the second vehicle-mounted AP is different from an operating channel of a vehicle-mounted AP (that is, the first vehicle-mounted AP) of a vehicle (that is, the first vehicle) that precedes the second vehicle and that is in the track branch (that is, the track) to which the second vehicle belongs.

It is not always necessary to establish a respective branch channel set of available channels for each track branch, provided that the second channel is different from an operating channel of a vehicle-mounted AP on a vehicle that precedes the second vehicle and that is in the track branch to which the second vehicle belongs. For example, in FIG. 2, there are two track branches (A2, C2, B2) and (A2, C2). The second vehicle and the first vehicle belong to (A2, C2, B2) and (A2, C2) respectively. The two track branches may use one branch channel set, that is, they have same available channel space. A quantity of elements in the branch channel set is greater than 2. The controller allocates operating channels in the branch channel set to vehicle-mounted APs according to a requirement that the second channel is different from an operating channel of a vehicle-mounted AP on a vehicle that precedes the second vehicle and that is in the track branch to which the second vehicle belongs. In this way, after the second vehicle enters a segment (C2, B2), it can still be ensured that the operating channel of the vehicle-mounted AP on the second vehicle is different from operating channels of vehicle-mounted APs on preceding and following vehicles. For example, the branch channel set in the foregoing case is (1, 2, 3, 4), and 1, 2, 3, and 4 are different channel identifiers. Vehicles that belong to (A2, C2, B2) and (A2, C2) depart alternately. In this case, the controller 602 successively and cyclically allocates channels 1 and 3 for vehicles that belong to (A2, C2, B2) and successively and cyclically allocates channels 2 and 4 for vehicles that belong to (A2, C2).

The foregoing two track branches that belong to one track refer to track segments whose WLAN signals may interfere with each other. If two track segments are connected, but WLAN signals do not interfere with each other, the two track segments may be treated as two different tracks. In FIG. 3, for example, if some vehicles depart from a point A3 and finish running at a point B3, and other vehicles depart from a point D3 and finish running at a point C3, there are two track segments (A3, D3, B3) and (D3, C3) in FIG. 3. If WLAN signals of the two track segments may interfere with each other at the point D3, (A3, D3, B3) and (D3, C3) are two track branches of a fixed track (A3, D3, (B3, C3)). If WLAN signals of the two track segments do not interfere with each other at the point D3, for example, at D3, (A3, D3, B3) and (D3, C3) pass by two different levels of platforms and WLAN signal interference between (A3, D3, B3) and (D3, C3) is extremely low, (A3, D3, B3) and (D3, C3) are two fixed tracks that are independent of each other. For example, in a subway system in a metropolitan city, different platforms are generally used in a transfer station for multiple subway lines, and WLAN signal interference between the multiple subway lines is extremely low. Therefore, different subway lines are generally treated as different fixed tracks.

The track may include two or more independent tracks. Directions of two independent tracks of the two or more independent tracks may be the same or opposite. For example, a subway line in a subway system may include two physical tracks in opposite directions. If different tunnels and different platforms are used for the two physical tracks and consequently there is no WLAN signal interference between the two physical tracks, the two physical tracks may be treated as different tracks. If one tunnel and one platform are used for the two physical tracks, WLAN signals of the two physical tracks may interfere with each other. Therefore, the two physical tracks are a first independent track and a second independent track that are of one track. Two sets of trackside APs 604 are installed along the two independent tracks respectively. Either set of trackside APs 604 has respective available channel space, and the two blocks of available channel space are independent of each other. That is, if the track includes a first independent track and a second independent track, and directions of the first independent track and the second independent track are opposite, a set of available channels for multiple trackside APs 604 that are installed along the first independent track is a first track channel set, a set of available channels for multiple trackside APs 604 that are installed along the second independent track is a second track channel set, and an intersection set of the first track channel set and the second track channel set is an empty set. Correspondingly, operating channels of vehicle-mounted APs on vehicles that belong to different independent tracks are specified in corresponding track channel sets.

The second channel has been specified by the controller 602 before the second vehicle departs, and during running of the second vehicle, the second channel is the current operating channel of the second vehicle-mounted AP carried by the second vehicle. Therefore, during an entire running course of the second vehicle, the second vehicle-mounted AP does not need to change its operating channel. That is, the operating channel of the second vehicle-mounted AP is specified by the controller 602. The controller 602 may specify, in a track channel set, an operating channel for the second vehicle-mounted AP. The track channel set may be stored in the controller 602, or may be stored in an independent storage device.

The vehicle-mounted APs and the trackside APs 604 may be connected using a wireless mesh network. That is, the WLAN is a wireless mesh network. The vehicle-mounted APs and the trackside APs 604 may alternatively be connected using a WDS.

If the WLAN is a wireless mesh network, multiple trackside APs 604 that are installed along the first independent track and multiple trackside APs 604 that are installed along the second independent track may belong to different MBSSs respectively. That is, an MBSS for the first independent track is a first MBSS, and an MBSS for the second independent track is a second MBSS. Correspondingly, when a vehicle turns to run in opposite direction after running to an endpoint along the first independent track, the controller 602 instructs a vehicle-mounted AP on the vehicle to be handed off from the first MBSS to the second MBSS.

The instructing a vehicle-mounted AP on the vehicle to be handed off from the first MBSS to the second MBSS may be implemented in multiple manners. For example, each vehicle has only one vehicle-mounted AP, and the controller 602 sends a profile about the second MBSS to the vehicle-mounted AP and instructs the vehicle-mounted AP to be handed off to the second MBSS. Each vehicle may alternatively have two (or more) vehicle-mounted APs, and configuration of each vehicle-mounted AP is completed according to a different MBSS. For example, the vehicle carries a third vehicle-mounted AP and a fourth vehicle-mounted AP, an MBSS for the third vehicle-mounted AP is the first MBSS, and an MBSS for the fourth vehicle-mounted AP is the second MBSS. When the vehicle runs along the first independent track, the third vehicle-mounted AP runs, and the fourth vehicle-mounted AP stops running. When the vehicle runs to an endpoint along the first independent track, the controller 602 instructs the fourth vehicle-mounted AP to run and instructs the third vehicle-mounted AP to stop running. Running and stop running herein may be enabling and disabling of the entire vehicle-mounted AP device, or may be enabling and disabling of a WLAN function of the vehicle-mounted AP.

An example is used in which the track is linear, the track includes only one independent track, and the independent track has no branch. All vehicles run on the independent track. Initially, operating channels of all trackside APs 604 in FIG. 6 are a channel A. A vehicle-mounted AP on a vehicle (for example, a rightmost vehicle in FIG. 6) that first departs searches for a WLAN signal and finds that there is only a signal of the channel A, that is, signal intensity of the signal of the channel A is the highest. Then, the vehicle-mounted AP sets its own operating channel to the channel A.

After the vehicle runs for a period of time, a distance between a first trackside AP 604 of the independent track and the vehicle exceeds a preset threshold, and an operating channel of the first trackside AP 604 does not change and is still the channel A. Then, the controller 602 determines that the trackside AP 604 is a to-be-changed trackside AP 604 for the vehicle. The controller 602 instructs the first trackside AP 604 of the independent track to change its operating channel to a channel B. The channel B is an operating channel that is allocated by the controller for a next vehicle that is to depart (for example, the first vehicle in FIG. 6, and the channel B is correspondingly the first channel). With running of the vehicle, a second trackside AP 604 and a third trackside AP 604 of the independent track may be determined as a to-be-changed trackside AP 604 for the vehicle successively such that the APs change their operating channels to the channel B. After the first vehicle departs, a vehicle-mounted AP on the first vehicle searches for a WLAN signal, finds that signal intensity of a signal on the channel B is the highest, and therefore sets an operating channel of the vehicle-mounted AP to the channel B. After the first vehicle runs for a period of time, a first trackside AP of the independent track is determined as a to-be-changed trackside AP for the first vehicle again such that the first trackside AP is instructed to change its operating channel to a channel C. The channel C is an operating channel that is allocated by the controller 602 for a next vehicle that is to depart (for example, the second vehicle in FIG. 6, and the channel C is correspondingly the second channel). By analogy, the controller 602 instructs a trackside AP 604 behind each running vehicle to be used as a to-be-changed trackside AP 604, to change an operating channel of the trackside AP 604 to an operating channel of a next vehicle. For example, at a moment shown in FIG. 6, the third, seventh, and eleventh trackside Aps 604, from the left to the right, of the trackside APs 604 in FIG. 6 are respectively the second vehicle, the first vehicle, and a to-be-changed trackside AP 604 for the rightmost vehicle in FIG. 6.

Figure 7:
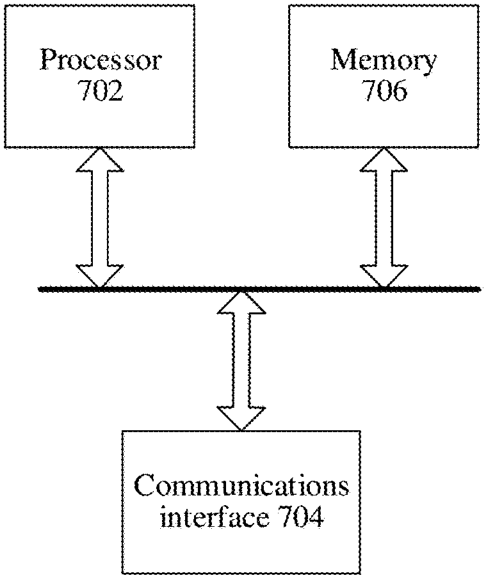
FIG. 7 is a structural diagram of a controller according to an embodiment of the present disclosure.

FIG. 7 is a structural diagram of a controller according to an embodiment of the present disclosure.

The controller may be a server, may be a network device such as a router or a network switch, or may be a control center including multiple devices.

The controller includes a processor 702 and a communications interface 704. The processor 702 is connected to the communications interface 704. For example, the processor 702 may be connected to the communications interface 704 using a bus.

The processor 702 may be a central processing unit (CPU), a network processor (NP), or a combination of a CPU and an NP. The processor 702 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or a combination thereof.

The communications interface 704 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be, for example, a WLAN interface, a cellular network communications interface, or a combination thereof. The communications interface 704 is configured to connect to multiple trackside APs, where the multiple trackside APs are installed along a track, at least two vehicles run on the track, and each of the at least two vehicles carries a respective vehicle-mounted AP. The communications interface 704 may be directly connected to each trackside AP, or may be connected to the multiple trackside APs via another network device, or may be connected to one of the multiple trackside APs via another trackside AP of the multiple trackside APs.

The controller may further include a memory 706. The memory 706 may include a volatile memory, such as a random-access memory (RAM), the memory 706 may include a non-volatile memory, such as a read-only memory (ROM), a flash memory, a hard disk drive (HDD), and a solid-state drive (SSD), or the memory 706 may include a combination of the forgoing types of memories. The memory 706 may be configured to store a track channel set. The memory 706 may further store parameters (for example, positions, powers, or optional track channel sets) of the trackside APs, track topology data, data about surrounding terrains of the track, positions of platforms, a vehicle running schedule, and the like. If the processor 702 includes a CPU, the memory 706 may further store program code and transmit the program code to the CPU such that the CPU implements the embodiments of the present disclosure according to an instruction of the program code.

The processor 702 is configured to determine a to-be-changed trackside AP for a first vehicle, among the multiple trackside APs, where the to-be-changed trackside AP for the first vehicle is a trackside AP that is behind the first vehicle according to a running direction of the first vehicle and whose distance to the first vehicle exceeds a preset threshold, a current operating channel of the to-be-changed trackside AP for the first vehicle is a first channel, and the first channel is an operating channel of a first vehicle-mounted AP carried by the first vehicle. The processor 702 is further configured to instruct, using the communications interface 704, the to-be-changed trackside AP for the first vehicle to change the operating channel to a second channel, where the second channel is an operating channel of a second vehicle-mounted AP carried by a second vehicle, the second vehicle is a vehicle following the first vehicle, the second channel is different from the first channel, and the first vehicle and the second vehicle belong to one independent track.

Each vehicle may carry one or more vehicle-mounted APs. If multiple vehicle-mounted APs are carried by one vehicle, the multiple vehicle-mounted APs may use one operating channel, or may use different operating channels. If the multiple vehicle-mounted APs use one operating channel, the vehicle-mounted APs may be considered as one vehicle-mounted AP. If the multiple vehicle-mounted APs use different operating channels, the vehicle-mounted APs carried by one vehicle that use different operating channels may be considered as vehicle-mounted APs carried by different vehicles. Vehicle-mounted APs carried by one vehicle that use different operating channels may be considered as vehicle-mounted APs carried by different vehicles on one independent track, or may be considered as vehicle-mounted APs carried by vehicles on different independent tracks. For example, if vehicle-mounted APs carried by one vehicle that use different operating channels are considered as vehicle-mounted APs carried by vehicles on different independent tracks, two sets of trackside APs are installed beside a track. Either set of trackside APs has respective available channel space, and the two blocks of available channel space are independent of each other. That is, the track is considered to include a third independent track and a fourth independent track. Directions of the third independent track and the fourth independent track are the same. A set of available channels for multiple trackside APs that are installed along the third independent track is a third track channel set. A set of available channels for multiple trackside APs that are installed along the fourth independent track is a fourth track channel set. An intersection set of the third track channel set and the fourth track channel set is an empty set. Correspondingly, the vehicle carries two vehicle-mounted APs that belong to the third independent track and the fourth independent track respectively, and operating channels of vehicle-mounted APs that belong to different independent tracks are specified in corresponding track channel sets. With the foregoing deployment, total bandwidth of vehicle-mounted APs on vehicles can be increased.

To shorten a time for handing over a vehicle-mounted AP between trackside APs, an operating channel of the vehicle-mounted AP needs to be kept unchanged in an entire running course of a vehicle, and a trackside AP needs to use an operating channel the same as that of the vehicle-mounted AP on the vehicle when the vehicle approaches the trackside AP. In this case, the processor 702 instructs, using the communications interface 704 and according to a position of the vehicle, a trackside AP that is behind the vehicle and far from the vehicle, to switch to an operating channel used by a next vehicle. The trackside AP that needs to be instructed by the controller to switch to the operating channel used by the next vehicle is a to-be-changed trackside AP. An example is used in which a channel of a trackside AP between the first vehicle and the second vehicle is changed. The to-be-changed trackside AP is a to-be-changed trackside AP for the first vehicle, and the to-be-changed trackside AP for the first vehicle is a trackside AP that is behind the first vehicle and whose distance to the first vehicle exceeds a preset threshold. The preset threshold may be a distance threshold, or may be a quantity threshold. The preset threshold may be related to a distance between two vehicles on the track, for example, about one half or one third of the distance between two vehicles on the track, or may be a quantity of trackside APs that represents the foregoing distance.

If the preset threshold is a distance threshold, determining, by the processor 702, a to-be-changed trackside AP for a first vehicle, among the multiple trackside APs includes obtaining, by the processor 702, a physical position of the first vehicle, and determining, as the to-be-changed trackside AP, a trackside AP of the multiple trackside APs that is behind the first vehicle, whose current operating channel is the first channel, and from whose physical position a distance to the physical position of the first vehicle is greater than the distance threshold. The distance threshold may be a fixed value, or may be a variable value.

A speed at which the vehicle runs on the track is variable. For example, when the vehicle stops by a platform, the speed of the vehicle is zero. A channel change takes time, and a vehicle that is running at a high speed requires that a front trackside AP farther from the vehicle change a channel in advance. Therefore, it may be considered that the distance threshold is set to be a function of a speed of the second vehicle. The second vehicle is a vehicle following the first vehicle. Because a vehicle in rail transport generally runs according to a predetermined plan, a speed of the vehicle and a position of the vehicle are related. For example, a speed of a vehicle between two platforms is generally high, and a speed of a vehicle that approaches or reaches a platform is generally low. Therefore, the distance threshold may alternatively be a function of a physical position of the second vehicle or a function of a trackside AP that is communicating with the second vehicle-mounted AP carried by the second vehicle. Similarly, because running of the second vehicle is closely related to that of the first vehicle, the distance threshold may alternatively be a function of the physical position of the first vehicle or a function of a trackside AP that is communicating with the first vehicle-mounted AP carried by the first vehicle. When the foregoing function is established, the distance threshold may be further adjusted with reference to a terrain factor, for example, according to a fact that the vehicle is on an open ground, in a mountainous area, or in a tunnel.

The physical position of the first vehicle may be represented by coordinates of the first vehicle in three-dimensional space, or may be represented by a distance on a track and to a particular point (for example, a start point of the track). The distance may be a spatial distance, or may be a length of extension along the track. For example, if the track is curved, a spatial distance between two points on the curved track is less than a length of extension between the two points along the track. No matter how a distance is defined, implementation of this embodiment of the present disclosure is not impeded. Data about the physical position of the first vehicle may come from outside a WLAN system, for example, from a train dispatch system, a subway monitoring center, or positioning data of the vehicle itself, such as GPS data of the vehicle.

Data about the physical position of the first vehicle may alternatively come from a WLAN system itself. A device in the WLAN system may obtain some parameters from another device in the WLAN system to estimate the physical position of the first vehicle. The device in the WLAN system may be a controller, or may be a device other than the controller. The device other than the controller estimates the physical position of the first vehicle and then sends the data about the physical position to the controller.

For example, the device in the WLAN system may store a physical position of each trackside AP in advance. A vehicle-mounted AP on a vehicle generally selects to communicate with a trackside AP having a strongest signal. The trackside AP having the strongest signal is generally relatively close to the vehicle. Therefore, a physical position of a trackside AP that is communicating with the vehicle-mounted AP on the first vehicle may be used as the physical position of the first vehicle.

Further, the device in the WLAN system may consider more factors, for example, a speed of the first vehicle in order to estimate the physical position of the first vehicle more accurately. For example, the vehicle-mounted AP on the first vehicle is a first vehicle-mounted AP. Then, the physical position of the first vehicle may be estimated according to a physical position of a trackside AP of the multiple trackside APs that is communicating with the first vehicle-mounted AP, a radio link setup time, and a speed of the first vehicle. The radio link setup time is a time that a radio link is set up between the first vehicle-mounted AP and the trackside AP that is communicating with the first vehicle-mounted AP. For example, the physical position of the trackside AP that is communicating with the first vehicle-mounted AP is L meters, a radio link was set up T seconds ago between the first vehicle-mounted AP and the trackside AP that is communicating with the first vehicle-mounted AP, and a speed of the first vehicle is V meters/second. In this case, the physical position of the first vehicle is $L+T*V$ meters.

The data about the speed of the first vehicle may come from outside the WLAN system, for example, from a train dispatch system, a subway monitoring center, or positioning data of the vehicle itself, such as GPS data of the vehicle.

The data about the speed of the first vehicle may alternatively be estimated by a device in the WLAN system according to a history of trackside APs that communicate with the vehicle-mounted AP on the first vehicle. For example, a trackside AP that is communicating with the first vehicle-mounted AP at T1 seconds is an AP 1, and a physical position of the AP 1 is L1 meters, a trackside AP that is communicating with the first vehicle-mounted AP at T2 seconds is an AP 2, and a physical position of the AP 2 is L2 meters. In this case, a speed of the first vehicle is (L2−L1)/(T2−T1).

If the preset threshold is a quantity threshold, determining, by the processor 702, a to-be-changed trackside AP for a first vehicle, among the multiple trackside APs includes obtaining, by the processor 702, a trackside AP that is communicating with the first vehicle-mounted AP carried by the first vehicle, and using, as the to-be-changed trackside AP, a trackside AP that is behind the trackside AP that is communicating with the first vehicle-mounted AP carried by the first vehicle, where a distance between the trackside APs exceeds N. N is the quantity threshold. N may be a fixed value, or may be a variable value.

N may be a function of a speed of the second vehicle. N may alternatively be a function of a physical position of the second vehicle, or a function of a trackside AP that is communicating with a second vehicle-mounted AP carried by the second vehicle, or N may be a function of a physical position of the first vehicle, or a function of a trackside AP that is communicating with a first vehicle-mounted AP carried by the first vehicle.

There may be or was a radio link between the to-be-changed trackside AP for the first vehicle and the first vehicle-mounted AP carried by the first vehicle. A vehicle-mounted AP carried by a vehicle may set up respective radio links to multiple trackside APs. One of the radio links is used for communication between the vehicle-mounted AP and a trackside AP. A radio link between the vehicle-mounted AP and another trackside AP is a backup radio link. If a vehicle-mounted AP sets up a radio link to only one trackside AP, in a running history of a vehicle, the vehicle-mounted AP on the vehicle may have not set up radio links to all trackside APs by which the vehicle passed. Therefore, the to-be-changed trackside AP for the first vehicle did not necessarily set up a radio link to the first vehicle-mounted AP.

The second vehicle may be a vehicle that is running, or may be a vehicle that is to depart. If the second vehicle is a vehicle that is running following the first vehicle, the second channel is a current operating channel of the second vehicle-mounted AP carried by the second vehicle. If the second vehicle is a next vehicle that is to depart, the processor 702 needs to determine the second channel as an operating channel of the second vehicle-mounted AP carried by the second vehicle after the second vehicle departs. The second channel may be sent to the second vehicle-mounted AP in non-WLAN manner, or may not need to be sent to the second vehicle-mounted AP. The controller needs only to control the to-be-changed trackside AP to change to the second channel. After the second vehicle departs, the second vehicle-mounted AP is started, and the second vehicle-mounted AP searches for a WLAN signal, finds that signal intensity of a signal on the second channel is the highest, and therefore sets an operating channel of the second vehicle-mounted AP to the second channel. After that, during an entire running course of the second vehicle, the second vehicle-mounted AP does not need to change its operating channel.

If the track includes multiple track branches, the second vehicle and the first vehicle may belong to different track branches. For example, in FIG. 3, the first vehicle belongs to (A3, D3, B3), and the second vehicle belongs to (A3, D3, C3). If the second channel that is specified by the processor 702 for the second vehicle-mounted AP is different from only the first channel, it cannot be avoided that, after the second vehicle enters and runs in a segment (D3, C3), a channel of the second vehicle-mounted AP is the same as a channel of a vehicle-mounted AP on a vehicle preceding the second vehicle. Therefore, optionally, a respective branch channel set of available channels may be established for each track branch. The branch channel set is a track channel set for a track branch. An intersection set of branch channel sets for any two track branches is an empty set. Consequently, the second channel that is specified by the processor 702 for the second vehicle-mounted AP is a channel in a branch channel set for a track branch to which the second vehicle belongs, and the second channel is different from an operating channel of a vehicle-mounted AP on a vehicle that precedes the second vehicle and that is in the track branch to which the second vehicle belongs.

If a track includes multiple track branches, but the first vehicle and the second vehicle belong to one track branch, the second channel that is specified by the processor 702 for the second vehicle-mounted AP is different from an operating channel of a vehicle-mounted AP (that is, the first vehicle-mounted AP) of a vehicle (that is, the first vehicle) that precedes the second vehicle and that is in the track branch to which the second vehicle belongs.

If a track includes only one track branch, the branch channel set is a set of available channels for the track, and the second channel that is specified by the processor 702 for the second vehicle-mounted AP is different from an operating channel of a vehicle-mounted AP (that is, the first vehicle-mounted AP) of a vehicle (that is, the first vehicle) that precedes the second vehicle and that is in the track branch (that is, the track) to which the second vehicle belongs.

It is not always necessary to establish a respective branch channel set of available channels for each track branch, provided that the second channel is different from an operating channel of a vehicle-mounted AP on a vehicle that precedes the second vehicle and that is in the track branch to which the second vehicle belongs. For example, in FIG. 2, there are two track branches (A2, C2, B2) and (A2, C2). The second vehicle and the first vehicle belong to (A2, C2, B2) and (A2, C2) respectively. The two track branches may use one branch channel set, that is, they have same available channel space. A quantity of elements in the branch channel set is greater than 2. The processor 702 allocates operating channels in the branch channel set to vehicle-mounted APs according to a requirement that the second channel is different from an operating channel of a vehicle-mounted AP on a vehicle that precedes the second vehicle and that is in the track branch to which the second vehicle belongs. In this way, after the second vehicle enters a segment (C2, B2), it can still be ensured that the operating channel of the vehicle-mounted AP on the second vehicle is different from operating channels of vehicle-mounted APs on preceding and following vehicles. For example, the branch channel set in the foregoing case is (1, 2, 3, 4), and 1, 2, 3, and 4 are different channel identifiers. Vehicles that belong to (A2, C2, B2) and (A2, C2) depart alternately. In this case, the processor 702 successively and cyclically allocates channels 1 and 3 for vehicles that belong to (A2, C2, B2) and successively and cyclically allocates channels 2 and 4 for vehicles that belong to (A2, C2).

The foregoing two track branches that belong to one track refer to track segments whose WLAN signals may interfere with each other. If two track segments are connected, but WLAN signals do not interfere with each other, the two track segments may be treated as two different tracks. In FIG. 3, for example, if some vehicles depart from a point A3 and finish running at a point B3, and other vehicles depart from a point D3 and finish running at a point C3, there are two track segments (A3, D3, B3) and (D3, C3) in FIG. 3. If WLAN signals of the two track segments may interfere with each other at the point D3, (A3, D3, B3) and (D3, C3) are two track branches of a fixed track (A3, D3, (B3, C3)). If WLAN signals of the two track segments do not interfere with each other at the point D3, for example, at D3, (A3, D3, B3) and (D3, C3) pass by two different levels of platforms and WLAN signal interference between (A3, D3, B3) and (D3, C3) is extremely low, (A3, D3, B3) and (D3, C3) are two fixed tracks that are independent of each other. For example, in a subway system in a metropolitan city, different platforms are generally used in a transfer station for multiple subway lines, and WLAN signal interference between the multiple subway lines is extremely low. Therefore, different subway lines are generally treated as different fixed tracks.

The track may include two or more independent tracks. Directions of two independent tracks of the two or more independent tracks may be the same or opposite. For example, a subway line in a subway system may include two physical tracks in opposite directions. If different tunnels and different platforms are used for the two physical tracks and consequently there is no WLAN signal interference between the two physical tracks, the two physical tracks may be treated as different tracks. If one tunnel and one platform are used for the two physical tracks, WLAN signals of the two physical tracks may interfere with each other. Therefore, the two physical tracks are a first independent track and a second independent track that are of one track. Two sets of trackside APs are installed along the two independent tracks respectively. Either set of trackside APs has respective available channel space, and the two blocks of available channel space are independent of each other. That is, if the track includes a first independent track and a second independent track, and directions of the first independent track and the second independent track are opposite, a set of available channels for multiple trackside APs that are installed along the first independent track is a first track channel set, a set of available channels for multiple trackside APs that are installed along the second independent track is a second track channel set, and an intersection set of the first track channel set and the second track channel set is an empty set. Correspondingly, operating channels of vehicle-mounted APs on vehicles that belong to different independent tracks are specified in corresponding track channel sets.

The second channel has been specified by the processor 702 before the second vehicle departs, and during running of the second vehicle, the second channel is the current operating channel of the second vehicle-mounted AP carried by the second vehicle. Therefore, during an entire running course of the second vehicle, the second vehicle-mounted AP does not need to change its operating channel. That is, the operating channel of the second vehicle-mounted AP is specified by the processor 702. The processor 702 may specify, in a track channel set, an operating channel for the second vehicle-mounted AP. The track channel set may be stored in the memory 706 of the controller, or may be stored in an independent storage device.

The vehicle-mounted APs and the trackside APs may be connected using a wireless mesh network. That is, the WLAN is a wireless mesh network. The vehicle-mounted APs and the trackside APs may alternatively be connected using a WDS.

If the WLAN is a wireless mesh network, multiple trackside APs that are installed along the first independent track and multiple trackside APs that are installed along the second independent track may belong to different MBSSs respectively. That is, an MBSS for the first independent track is a first MBSS, and an MBSS for the second independent track is a second MBSS. Correspondingly, when a vehicle turns to run in opposite direction after running to an endpoint along the first independent track, the processor 702 instructs, using the communications interface 704, a vehicle-mounted AP on the vehicle to be handed off from the first MBSS to the second MBSS.

The instructing a vehicle-mounted AP on the vehicle to be handed off from the first MBSS to the second MBSS may be implemented in multiple manners. For example, each vehicle has only one vehicle-mounted AP, and the processor 702 sends, using the communications interface 704, a profile about the second MBSS to the vehicle-mounted AP and instructs the vehicle-mounted AP to be handed off to the second MBSS. Each vehicle may alternatively have two (or more) vehicle-mounted APs, and configuration of each vehicle-mounted AP is completed according to a different MBSS. For example, the vehicle carries a third vehicle-mounted AP and a fourth vehicle-mounted AP, an MBSS for the third vehicle-mounted AP is the first MBSS, and an MBSS for the fourth vehicle-mounted AP is the second MBSS. When the vehicle runs along the first independent track, the third vehicle-mounted AP runs, and the fourth vehicle-mounted AP stops running. When the vehicle runs to an endpoint along the first independent track, the processor 702 instructs, using the communications interface 704, the fourth vehicle-mounted AP to run and instructs, using the communications interface 704, the third vehicle-mounted AP to stop running. The running and stopping running herein may be enabling and disabling of the entire vehicle-mounted AP device, or may be enabling and disabling a WLAN function of the vehicle-mounted AP.

A person of ordinary skill in the art may understand that all or some of the steps in each of the foregoing method of the embodiments may be implemented by a program instructing a processor. The foregoing program may be stored in a computer readable storage medium. The storage medium may be a RAM, ROM, a flash memory, a hard disk, an SSD, a magnetic tape, a floppy disk, an optical disc, or any combination thereof.

The foregoing descriptions are merely exemplary implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A channel management method for a wireless local area network (WLAN) in rail transport, wherein at least two vehicles run on a track, wherein each of the at least two vehicles carries a respective vehicle-mounted access point (AP), wherein a plurality of trackside APs are installed along the track, and wherein the channel management method comprises:

determining, by a controller, a to-be-changed trackside AP for a first vehicle, among the plurality of trackside APs, wherein the to-be-changed trackside AP for the first vehicle is a trackside AP behind the first vehicle according to a running direction of the first vehicle and whose distance to the first vehicle exceeds a threshold, wherein a current operating channel of the to-be-changed trackside AP for the first vehicle is a first channel, and wherein the first channel is an operating channel of a first vehicle-mounted AP carried by the first vehicle; and instructing, by the controller, the to-be-changed trackside AP for the first vehicle to change the current operating channel to a second channel based on the threshold being exceeded, wherein the second channel is an operating channel of a second vehicle-mounted AP carried by a second vehicle, wherein the second vehicle is a vehicle following the first vehicle, and wherein the second channel is different from the first channel.

2. The channel management method of claim 1, wherein the threshold is a distance threshold, and wherein determining the to-be-changed trackside AP comprises:

obtaining, by the controller, a physical position of the first vehicle; and determining, by the controller, as the to-be-changed trackside AP, a trackside AP of the plurality of trackside APs behind the first vehicle, whose current operating channel is the first channel, and from whose physical position, a distance to the physical position of the first vehicle is greater than the distance threshold.

3. The channel management method of claim 2, wherein obtaining the physical position of the first vehicle comprises estimating the physical position of the first vehicle according to a physical position of a trackside AP of the plurality of trackside APs communicating with the first vehicle-mounted AP.

4. The channel management method of claim 2, wherein obtaining the physical position of the first vehicle comprises estimating the physical position of the first vehicle according to a physical position of a trackside AP of the plurality of trackside APs communicating with the first vehicle-mounted AP, a radio link setup time, and a speed of the first vehicle, and wherein the radio link setup time is a time that a radio link is set up between the first vehicle-mounted AP and the trackside AP communicating with the first vehicle-mounted AP.

5. The channel management method of claim 1, wherein the second vehicle departed immediately after the first vehicle such that there are no other vehicles between the first vehicle and the second vehicle, wherein the second channel is a channel specified by the controller, and wherein the second channel is different from an operating channel of a vehicle-mounted AP on a vehicle that precedes the second vehicle in a track branch to which the second vehicle belongs.

6. The channel management, method of claim 5, Wherein the track comprises a plurality of track branches, wherein the second vehicle and the first vehicle belong to different track branches of the plurality of track branches, wherein each of the plurality of track branches has a respective branch channel set, wherein an intersection set of branch channel sets for any two track branches of the plurality of track branches is an empty set, and wherein the second channel is a channel in a branch channel set for the track branch to which the second vehicle belongs.

7. The channel management method of claim 1, wherein the track comprises a first independent track and a second independent track, wherein a set of available channels for a plurality of trackside APs installed along the first independent track is a first track channel set, wherein a set of available channels for a plurality of trackside APs installed along the second independent track is a second track channel set, wherein an intersection set of the first track channel set and the second track channel set is an empty set, wherein directions of the first independent track and the second independent track are opposite, wherein the WLAN is a wireless mesh network, wherein a mesh basic service set (MBSS) for the first independent track is a first MBSS, wherein an MBSS for the second independent track is a second MBSS, and wherein the method further comprises instructing, by the controller, a vehicle-mounted AP on a third vehicle that runs to an endpoint along the first independent track to be handed off from the first MBSS to the second MBSS.

8. The channel management method of claim 7, wherein the third vehicle carries a third vehicle-mounted AP and a fourth vehicle-mounted AP, wherein an MBSS for the third vehicle-mounted AP is the first MBSS, wherein an MBSS for the fourth vehicle-mounted AP is the second MBSS, and wherein when a WLAN function of the third vehicle-mounted AP is enabled, and a WLAN function of the fourth vehicle-mounted AP is disabled, instructing the vehicle-mounted AP on the third vehicle to be handed off from the first MBSS to the second MBSS comprises:

instructing, by the controller, the WLAN function of the fourth vehicle-mounted AP to be enabled; and instructing, by the controller, the WLAN function of the third vehicle-mounted AP to be disabled.

9. A wireless local area network (WLAN) system in rail transport, comprising:

a plurality of trackside access points (APs); and a controller coupled to each of the plurality of trackside APs, wherein the plurality of trackside APs are installed along a track, wherein at least two vehicles run on the track, wherein each of the at least two vehicles carries a respective vehicle-mounted AP, wherein each of the plurality of trackside APs is configured to provide a radio link coupled to a vehicle-mounted AP, and wherein the controller is configured to:

determine a to-be-changed trackside AP for a first vehicle, among the plurality of trackside APs, wherein the to-be-changed trackside AP for the first vehicle is a trackside AP behind the first vehicle according to a running direction of the first vehicle and whose distance to the first vehicle exceeds a threshold, wherein a current operating channel of the to-be-changed trackside AP for the first vehicle is a first channel, and wherein the first channel is an operating channel of a first vehicle-mounted AP carried by the first vehicle; and instruct the to-be-changed trackside AP for the first vehicle to change the current operating channel to a second channel based on the threshold being exceeded, wherein the second channel is an operating channel of a second vehicle-mounted AP carried by a second vehicle, and wherein the second vehicle is a vehicle following the first vehicle, wherein the second channel is different from the first channel.

10. The WLAN system of claim 9, wherein the threshold is a distance threshold, and wherein when determining the to-be-changed trackside AP, the controller is further configured to:

obtain a physical position of the first vehicle; and determine, as the to-be-changed trackside AP, a trackside AP of the plurality of trackside APs behind the first vehicle, whose current operating channel is the first channel, and from whose physical position, a distance to the physical position of the first vehicle is greater than the distance threshold.

11. The WLAN system of claim 10, wherein when obtaining the physical position of the first vehicle, the controller is further configured to estimate the physical position of the first vehicle according to a physical position of a trackside AP of the plurality of trackside APs communicating with the first vehicle-mounted AP.

12. The WLAN system of claim 9, further comprising the first vehicle-mounted AP and the second vehicle-mounted AP.

13. A controller, comprising:

a processor; and a communications interface coupled to the processor, wherein the communications interface is configured to couple to a plurality of trackside access points (APs), wherein the plurality of trackside APs are installed along a track, wherein at least two vehicles run on the track, wherein each of the at least two vehicles carries a respective vehicle-mounted AP, and wherein the processor is configured to:

determine a to-be-changed trackside AP for a first vehicle, among the plurality of trackside APs, wherein the to-be-changed trackside AP for the first vehicle is a trackside AP behind the first vehicle according to a running direction of the first vehicle and whose distance to the first vehicle exceeds a threshold, wherein a current operating channel of the to-be-changed trackside AP for the first vehicle is a first channel, and wherein the first channel is an operating channel of a first vehicle-mounted AP carried by the first vehicle; and instruct, using the communications interface, the to-be-changed trackside AP for the first vehicle to change the operating channel to a second channel based on the threshold being exceeded, wherein the second channel is an operating channel of a second vehicle-mounted AP carried by a second vehicle, wherein the second vehicle is a vehicle following the first vehicle, and wherein the second channel is different from the first channel.

14. The controller of claim 13, wherein the threshold is a distance threshold, and wherein when determining the to-be-changed trackside AP, the processor is further configured to:

obtain a physical position of the first vehicle; and determine, as the to-be-changed trackside AP, a trackside AP of the plurality of trackside APs behind the first vehicle, whose current operating channel is the first channel, and from whose physical position, a distance to the physical position of the first vehicle is greater than the distance threshold.

15. The controller of claim 14, wherein when obtaining the physical position of the first vehicle, the processor is further configured to estimate the physical position of the first vehicle according to a physical position of a trackside AP of the plurality of trackside APs communicating with the first vehicle-mounted AP.

16. The controller of claim 14, wherein when obtaining the physical position of the first vehicle, the processor is further configured to estimate the physical position of the first vehicle according to a physical position of a trackside AP of the plurality of trackside APs communicating with the first vehicle-mounted AR a radio link setup time, and a speed of the first vehicle, wherein the radio link setup time is a time that a radio link is set up between the first vehicle-mounted AP and the trackside AP communicating with the first vehicle-mounted AP.

17. The controller of claim 13, wherein the second vehicle departed immediately after the first vehicle such that there are no other vehicles between the first vehicle and the second vehicle, wherein the second channel is a channel specified by the controller, and wherein the second channel is different from an operating channel of a vehicle-mounted AP on a vehicle precedes the second vehicle in a track branch to which the second vehicle belongs.

18. The controller of claim 17, wherein the track comprises a plurality of track branches, wherein the second vehicle and the first vehicle belong to different track branches of the plurality of track branches, wherein each of the plurality of track branches has a respective branch channel set, wherein an intersection set of branch channel sets for any two track branches of the plurality of track branches is an empty set, and wherein the second channel is a channel in a branch channel set for the track branch to which the second vehicle belongs.

19. The controller of claim 13, wherein the track comprises a first independent track and a second independent track, wherein a set of available channels for a plurality of trackside APs installed along the first independent track is a first track channel set, wherein a set of available channels for a plurality of trackside APs installed along the second independent track is a second track channel set, wherein an intersection set of the first track channel set and the second track channel set is an empty set, wherein directions of the first independent track and the second independent track are opposite, wherein a wireless local area network (WLAN) is a wireless mesh network, wherein a mesh basic service set (MBSS) for the first independent track is a first MBSS, wherein an MBSS for the second independent track is a second MBSS, and wherein the processor is further configured to instruct, using the communications interface, a vehicle-mounted AP on a third vehicle that runs to an endpoint along the first independent track to be handed off from the first MBSS to the second MBSS.

20. The controller of claim 19, wherein the third vehicle carries a third vehicle-mounted AP and a fourth vehicle-mounted AP, wherein an MBSS for the third vehicle-mounted AP is the first MBSS, wherein an MBSS for the fourth vehicle-mounted AP is the second MBSS, and wherein when a WLAN function of the third vehicle-mounted AP is enabled, and a WLAN function of the fourth vehicle-mounted AP is disabled, instructing the vehicle-mounted AP on the third vehicle to be handed off from the first MBSS to the second MBSS, the processor is further configured to:

instruct using the communications interface, the WLAN function of the fourth vehicle-mounted AP to be enabled; and instruct, using the communications interface, the WLAN function of the third % vehicle-mounted AP to be disabled.

* * * * *

UNITED STATES PATENT AND TRADEMARK OFFICE

CERTIFICATE OF CORRECTION

PATENT NO. : 10,531,468 B2
APPLICATION NO. : 15/694446
DATED : January 7, 2020
INVENTOR(S) : Wei Ruan, Hongyi Tan and Mingyue Wang It is certified that error appears in the above-identified patent and that said Letters Patent is hereby corrected as shown below:

In the Claims

Claim 6, Column 39, Line 56: "Wherein" should read "wherein"

Claim 19, Column 42, Line 65: "third % vehicle-mounted" should read "third vehicle-mounted"

Signed and Sealed this
Twenty-fifth Day of February, 2020

Andrei Iancu
*Director of the United States Patent and Trademark Office*